US008904231B2

(12) United States Patent
Coatney et al.

(10) Patent No.: US 8,904,231 B2
(45) Date of Patent: Dec. 2, 2014

(54) SYNCHRONOUS LOCAL AND CROSS-SITE FAILOVER IN CLUSTERED STORAGE SYSTEMS

(75) Inventors: Susan Coatney, Cupertino, CA (US); Thomas B. Bolt, Sunnyvale, CA (US); Laurent Lambert, Santa Cruz, CA (US); Vaiapuri Ramasubramaniam, Sunnyvale, CA (US); Chaitanya Patel, Sunnyvale, CA (US); Sreelatha S. Reddy, Sunnyvale, CA (US); Hrishikesh Keremane, Sunnyvale, CA (US); Harihara Kadayam, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 314 days.

(21) Appl. No.: 13/569,874

(22) Filed: Aug. 8, 2012

(65) Prior Publication Data

US 2014/0047263 A1 Feb. 13, 2014

(51) Int. Cl.
  *G06F 11/07* (2006.01)
  *G06F 11/20* (2006.01)
  *G06F 12/08* (2006.01)
(52) U.S. Cl.
  CPC ........ *G06F 11/2023* (2013.01); *G06F 12/0802* (2013.01); *G06F 11/20* (2013.01); *G06F 12/0866* (2013.01); *G06F 2212/286* (2013.01)
  USPC .......................................... 714/6.3; 714/4.11
(58) Field of Classification Search
  CPC ............ G06F 11/2023; G06F 11/2069; G06F 11/2076
  USPC .................................................. 714/6.3, 4.11
  See application file for complete search history.

(56) References Cited

U.S. PATENT DOCUMENTS

| 6,748,510 | B1 | 6/2004 | Coatney |
| 6,941,384 | B1 | 9/2005 | Aiken, Jr. et al. |
| 7,321,982 | B2 | 1/2008 | Coatney et al. |
| 7,694,166 | B1 | 4/2010 | Suggs et al. |
| 7,702,947 | B2 * | 4/2010 | Peddada ........................ 714/4.1 |
| 8,225,129 | B2 | 7/2012 | Douglis et al. |
| 2009/0307355 | A1 * | 12/2009 | Lenz et al. ..................... 709/226 |
| 2011/0225095 | A1 * | 9/2011 | Gawali et al. ................. 705/300 |
| 2012/0023209 | A1 * | 1/2012 | Fletcher et al. ............... 709/223 |
| 2012/0259819 | A1 * | 10/2012 | Patwardhan et al. ......... 707/674 |

OTHER PUBLICATIONS

International Search Report and Written Opinion mailed Dec. 19, 2013 in Co-Pending PCT Application No. PCT/US2013/054180 of Coatney, S., et al., filed Aug. 8, 2013, 8 pages.

* cited by examiner

*Primary Examiner* — Chae Ko
(74) *Attorney, Agent, or Firm* — Perkins Coie LLP

(57) ABSTRACT

Synchronous local and cross-site switchover and switchback operations of a node in a disaster recovery (DR) group are described. In one embodiment, during switchover, a takeover node receives a failover request and responsively identifies a first partner node in a first cluster and a second partner node in a second cluster. The first partner node and the takeover node form a first high-availability (HA) group and the second partner node and a third partner node in the second cluster form a second HA group. The first and second HA groups form the DR group and share a storage fabric. The takeover node synchronously restores client access requests associated with a failed partner node at the takeover node.

30 Claims, 18 Drawing Sheets

NORMAL OPERATION

NODE A

NODE C

NODE B

NODE D

FAILURE OF NODE A (HA MODE)

NODE A

NODE C

NODE B

NODE D

SYNCHRONOUS LOCAL AND CROSS-SITE FAILOVER IN CLUSTERED STORAGE SYSTEMS

FIELD OF THE INVENTION

At least one embodiment of the present invention pertains to storage systems, and more particularly, to system configurations and methods for synchronous local and cross-site failover in clustered storage systems.

BACKGROUND

A storage server is a computer system and a form of storage controller that is used to store and retrieve data on behalf of one or more clients on a network. A storage server operates on behalf of one or more clients to store and manage data in a set of mass storage devices, such as magnetic or optical storage-based disks or tapes or solid state storage such as flash memory. A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, such as certain storage servers made by NetApp®, Inc. of Sunnyvale, Calif.

To improve storage availability and performance, multiple individual storage servers can be integrated into a clustered storage system. A computer cluster typically consists of a set of loosely connected computers that work together so that, in many respects, the computers can be viewed as a single system. The components of a computer cluster are usually connected to each other through fast local area networks, each node (e.g., computer used as a server) running its own instance of an operating system. In this manner, each storage server in a clustered storage system can be used to access and store critical data, among other purposes. Additionally, a clustered storage system is able to provide load-balancing and/or failover capabilities.

To provide data backup in a storage system, including a clustered storage system, a data backup technique known as "aggregate mirroring" can be implemented. Aggregate mirroring involves backing up or replicating data stored in mass storage devices (also referred to as aggregates) at a primary site with an exact duplicate (i.e., mirror image) of the data in mass storage devices at a remote or secondary site. Thus, if data or connectivity is ever lost at the primary site, the data can be recovered or is accessible to a client from the secondary site.

In a storage server that handles large volumes of client requests, it may be impractical to save data modifications to the mass storage devices every time a write request is received from a client. This is primarily because disk accesses tend to take a relatively long time to complete in comparison to other operations. Accordingly, a storage server can store or cache write requests received from clients in a temporary data cache and periodically write the data in the data cache out to the mass storage devices or disks. The event of saving or writing the data in the data cache out to the mass storage devices or disks is called a "consistency point." At a consistency point, the storage system saves any data that is modified by the write requests received from clients to its mass storage devices and triggers a process of updating the data stored at the mirror site to reflect the updated primary volume.

In prior art solutions, if a failure occurred in a storage system or in a storage cluster in between consistency points (i.e., prior to the data in the data cache being written out to disk), then although the clustered storage environment provides for failover to another node or cluster, the recovery process at the failover storage system will still be asynchronous because the failover node does not have access to the cache data associated with the node that failed. That is, the data that is stored in the data cache system of the failed node will be lost or temporarily unavailable to client systems.

SUMMARY

The techniques introduced herein provide for systems and methods for synchronous local and cross-site failover. In particular, synchronous local and cross-site switchover and switchback operations of a node in a disaster recovery (DR) group are described. Additionally, an underlying cache management technique that enables the synchronous local and cross-site failover is described.

In one embodiment, local and cross-site failover operations of a takeover node in a first cluster of disaster recovery (DR) group is described. The takeover node receives a failover request and processes the failover request to identify a first partner node in the first cluster at a first site and a second partner node in a second cluster at a second site. The first partner node and the takeover node form a first high-availability (HA) group in the first cluster. Similarly, the second partner node and a third partner node form a second HA group in the second cluster. The first HA group and the second HA group form the DR group and share a storage fabric with each other. In response to receiving the failover request, the takeover node synchronously restores client access requests associated with a failed partner node at the takeover node.

In another embodiment, a storage node in a first cluster of a clustered storage system is disclosed. The storage node includes an interface, a node management module, and a cache system. The interface receives a cluster switchover request. The request indicates the intent (e.g., from a system administer or script) to failover from a second cluster located at a second site of the clustered storage system to the first cluster located at a first site. The node management module processes the cluster switchover request to identify a first partner node in the first cluster and a second partner node in the second cluster. In response to the cluster switchover request, the node management module assigns ownership of a first storage container in a shared storage fabric from the second partner node to the storage node. The first storage container is located at the first site, the first partner node and the storage node form a first high-availability (HA) group, the second partner node and a third partner node in the second cluster form a second HA group, and the first HA group and the second HA group form a disaster recovery (DR) group. The HA groups also share the storage fabric with each other. The cache system stores cache data associated with the storage node, replicated cache data associated with the first partner node, and replicated cache data associated with the second partner node.

In another embodiment, cache data (e.g., NVRAM) mirroring or replication by a source cluster in a DR group is described. The source cluster first receives a client write request including write data and an indication of a logical container indicating a location to which to write the write data. The source cluster identifies a source node in the source cluster that is associated with the logical container. The source node includes a source cache system. The source cluster identifies a first partner node in the source cluster and a second partner node in a destination cluster. The first partner node has a first cache system and the second partner node has a second cache system. The source cluster then concurrently writes the client write data to the source cache system, the first cache system, and the second cache system.

In another embodiment, a cluster of a DR group is described. The cluster includes a cluster management module and a first high-availability (HA) group. The cluster management module maintains configuration data associated with the cluster and replicated configuration data associated with a second cluster. The configuration data associated with the cluster is replicated or mirrored to the second cluster. The first HA group is located at a first site. The first HA group includes a first node having a first cache system and a second node having a second cache system. The first HA group and a second HA group located at a second site in the second cluster form the DR group and share a storage fabric. The second HA group includes a third node having a third cache system and a fourth node having a fourth cache system. Storage data directed to the first node is synchronously replicated to the second node and the third node and storage data directed to the second node is synchronously replicated to the first node and the fourth node.

In another embodiment, storage system operation can be improved through cache management. For example, storage system operation can be improved by optimizing mirroring of write caches of nodes of a network storage system. The write caches may be selectively mirrored, duplicated, or backed-up to various nodes of a DR group to accommodate a wide range of failure scenarios without mirroring the write caches of each node to every other node of the DR group. Accordingly, methods and apparatuses for cache mirroring optimization are introduced here.

For example, a network storage system can include a local storage cluster and a remote storage cluster. The remote storage cluster can include a first remote node and a second remote node. Temporary storage of the first remote node and temporary storage of the second remote node are operated as write caches for mass storage of the remote storage cluster. A local storage cluster can include a first local node and a second local node. Temporary storage of the first local node and temporary storage of the second local node are operated as write caches for mass storage of the local storage cluster. The local storage cluster is configured to synchronously duplicate data stored in temporary storage of the first local node in temporary storage of the second local node and in temporary storage of the first remote node. The local storage cluster is also configured to synchronously duplicate data stored in the temporary storage of the second local node in the temporary storage of the first local node and in temporary storage of the second remote node.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

FIGS. 11B and 5C illustrates mirroring of NVRAM in nodes of a HA group and a DR group of a network storage system, respectively.

Figure 1:
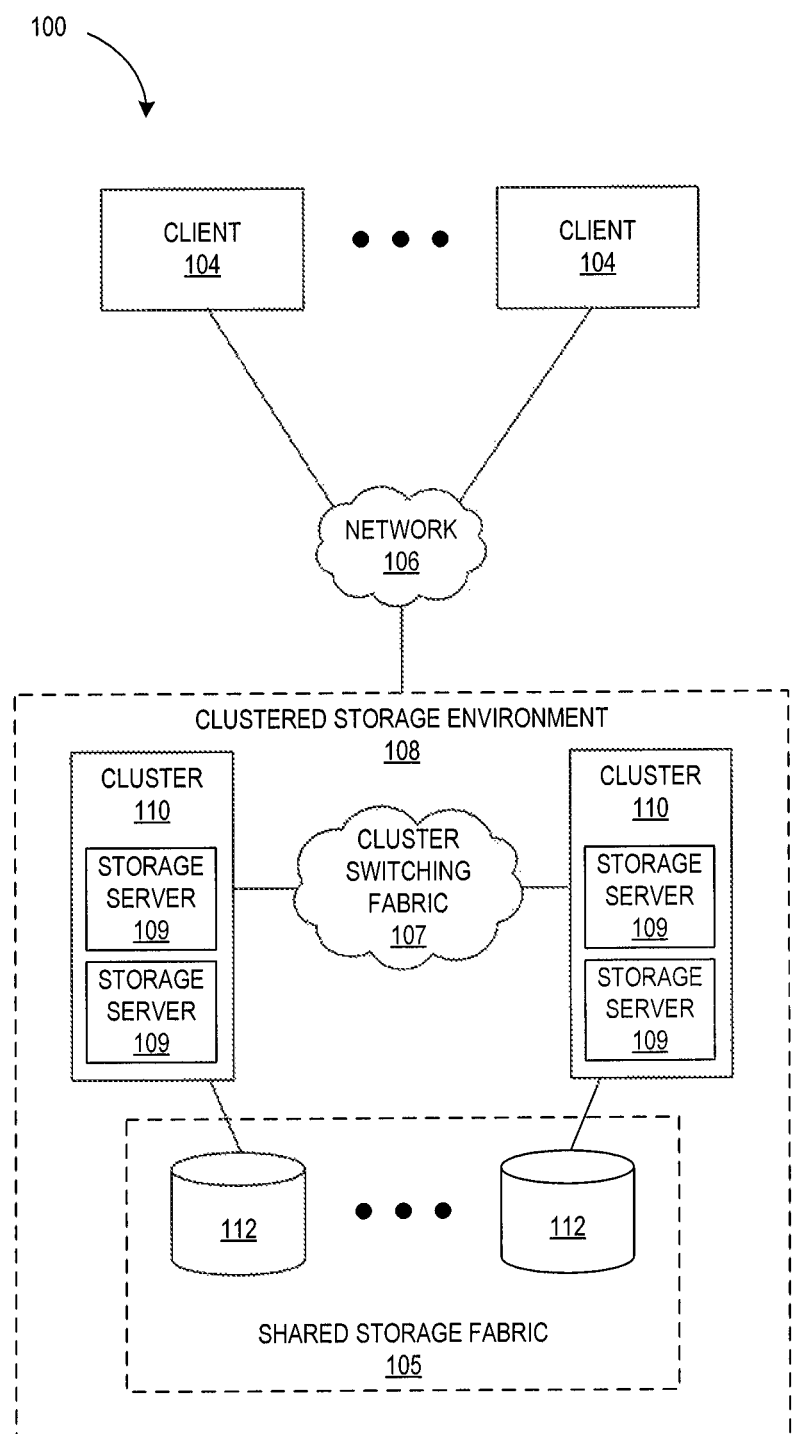
FIG. 1 shows an example of a network storage environment.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments are shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Systems and methods for synchronous local and cross-site backup in a clustered storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

In one embodiment, a disaster recovery (DR) system or group is described. The DR group includes a first high-availability (HA) group in a first cluster at a first geographic site or location and a second HA group in a second cluster located at a second geographic site or location. The first geographic location and the second geographic location are different so that a failure at one site does not necessarily result in a failure at the second site. In one embodiment, the DR group includes four nodes or storage servers. Each HA group includes two of the four nodes and each node has a single local HA partner node in the same cluster and a single remote DR partner node in the second or remote HA group. In addition, each node includes a data cache or non-volatile random access memory (NVRAM) system that is mirrored to the NVRAM of an HA partner node and a DR partner node via an NVRAM mirroring process described below.

The DR group provides synchronous local and cross-site disaster recovery in clustered storage environments. To achieve this goal, the DR group integrates aggregate mirroring, NVRAM mirroring, and configuration replication to provide a synchronous recovery or failover. In one embodiment, the aggregate mirroring involves backing up or replicating data stored in mass storage devices (also referred to as aggregates) at a primary site with an exact duplicate (i.e., mirror image) of the data in mass storage devices at a remote or secondary site.

In one embodiment, the NVRAM or data cache mirroring involves backing up or replicating data stored in a node's NVRAM to an HA partner node's NVRAM data and a DR partner node's NVRAM data. The configuration replication involves replicating cluster configuration information from the first cluster at the first site to the second cluster at the site, and visa versa. In one embodiment, the local and/or cross-site disaster recovery failover is triggered automatically via a script or single command issued by a system administrator.

By integrating the aggregate mirroring, NVRAM mirroring, and configuration replication, the DR groups described herein are able to provide synchronous local and cross-site failover in the event of a local node failure or a cluster failure. By providing synchronous failover, the DR group is able to overcome data loss and/or consistency issues described above. Further, in one embodiment, the clustered storage systems described provide the ability to failover to a node in the same cluster as the failed node.

Synchronous Failover

FIG. 1 shows an example of a network storage environment 100, which includes a plurality of client systems (clients) 104, a clustered storage environment 108, and a network 106 connecting the client systems 104 and the clustered storage environment 108. As shown in FIG. 1, the clustered storage environment 108 includes a shared storage fabric 105 having a number of mass storage devices (or storage containers) 112, such as disks. Alternatively, some or all of the mass storage devices 112 can be other types of storage, such as flash memory, solid-state drives (SSDs), tape storage, etc. However, to simplify description, the storage devices 112 are assumed to be disks herein.

The clustered storage environment 108 provides data storage services to the one or more clients 104 via a network 106. A client 104 may be, for example, a conventional personal computer (PC), server-class computer, workstation, handheld computing or communication device, or the like. The network 106 may be, for example, a local area network (LAN), wide area network (WAN), metropolitan area network (MAN), global area network such as the Internet, a Fibre Channel fabric, or any combination or variation of such interconnects. The clustered storage environment 108 allows storage capacities provided by a shared storage fabric 105 to be logically presented. Thus, the clustered storage environment 108 shields the physical implementations of the clusters 110 and their components (i.e., storage servers, etc.) from the clients 104. By interacting with the clustered storage environment 108, the clients 104 can view, access, and manage the clustered storage environment 108 as a single system, rather than individually communicating with each cluster 110 or each node or storage server within each cluster 110.

Each cluster 110 is formed by a plurality of cooperating storage servers 109. Once integrated into the cluster 110, each of the storage servers 109 can be referred to as a cluster node, a storage node, and/or a node in a cluster. The storage servers 109 that form a cluster node can be a file-level storage server such as used in a NAS environment, a block-level storage server such as used in a SAN environment, or a storage server which is capable of providing both file-level and block-level service. Although the clients 104 appear to communicate directly with the clustered storage environment 108, the various read and write requests sent from the clients 104 are in fact transmitted to the appropriate cluster 110 and directed to data stored in or to be stored in the storage servers 109. The clustered nodes 109 are connected with their respective storage units 112. As discussed, these storage units 112 can include, for example, conventional magnetic or optical disks or tape drives; alternatively, they can include non-volatile solid-state memory, such as flash memory, etc., or other types of storage devices. In this example, each cluster 110 includes two nodes 109 for simplicity of discussion. However, in practice a cluster 110 can include any number of nodes 109.

Each of the storage servers 109 can be, for example, one of the FAS-series of storage server products available from NetApp®, Inc. The client systems 104 are connected to the storage servers 109 via the network 106, which can be a packet-switched network, for example, a local area network (LAN) or wide area network (WAN) or combination or variation thereof. Further, the storage servers 109 can be connected to the disks 112 via the shared storage fabric 105, which can be a fiber distributed data interface (FDDI) network, for example. It is noted that, within the network data storage environment, any other suitable number of storage servers and/or mass storage devices, and/or any other suitable network technologies, may be employed.

The clustered storage environment 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). Storage of information in the shared storage fabric 105 can be implemented as one or more storage volumes that comprise a collection of physical storage disks 112 cooperating to define an overall logical arrangement of volume block number (VBN) space on the volume(s). Each volume is generally, although not necessarily, associated with its own file system.

The disks within a volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although other types and levels of RAID implementations may be used according to the techniques described herein. One or more RAID groups together form an aggregate. An aggregate can contain one or more volumes.

The storage servers 109 can receive and respond to various read and write requests from the client systems 104, directed to data stored in or to be stored in the shared storage fabric 105. Each storage server 109 also includes an internal buffer cache (not shown), which can be implemented in a non-volatile RAM device such as a battery-backed DRAM, for example, or a non-volatile solid-state memory, such as flash memory.

Although the storage servers 109 are illustrated as a single units in FIG. 1, any one or more of the storage servers 109 can have a distributed architecture. For example, the storage server 109 can be designed as a physically separate network module (e.g., "N-blade") and disk module (e.g., "D-blade") (not shown), which communicate with each other over a physical interconnect. Such an architecture allows convenient scaling, such as by deploying two or more N-blades and D-blades, all capable of communicating with each other through the interconnect.

Further, the storage servers 109 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual machines, (e.g., to avoid interference) are able to run on the same physical machine because of the functional isolation provided by a virtual storage server implementation. This can be a more cost effective way of providing storage server solutions to multiple customers than providing separate physical server resources for each customer.

Figure 2:
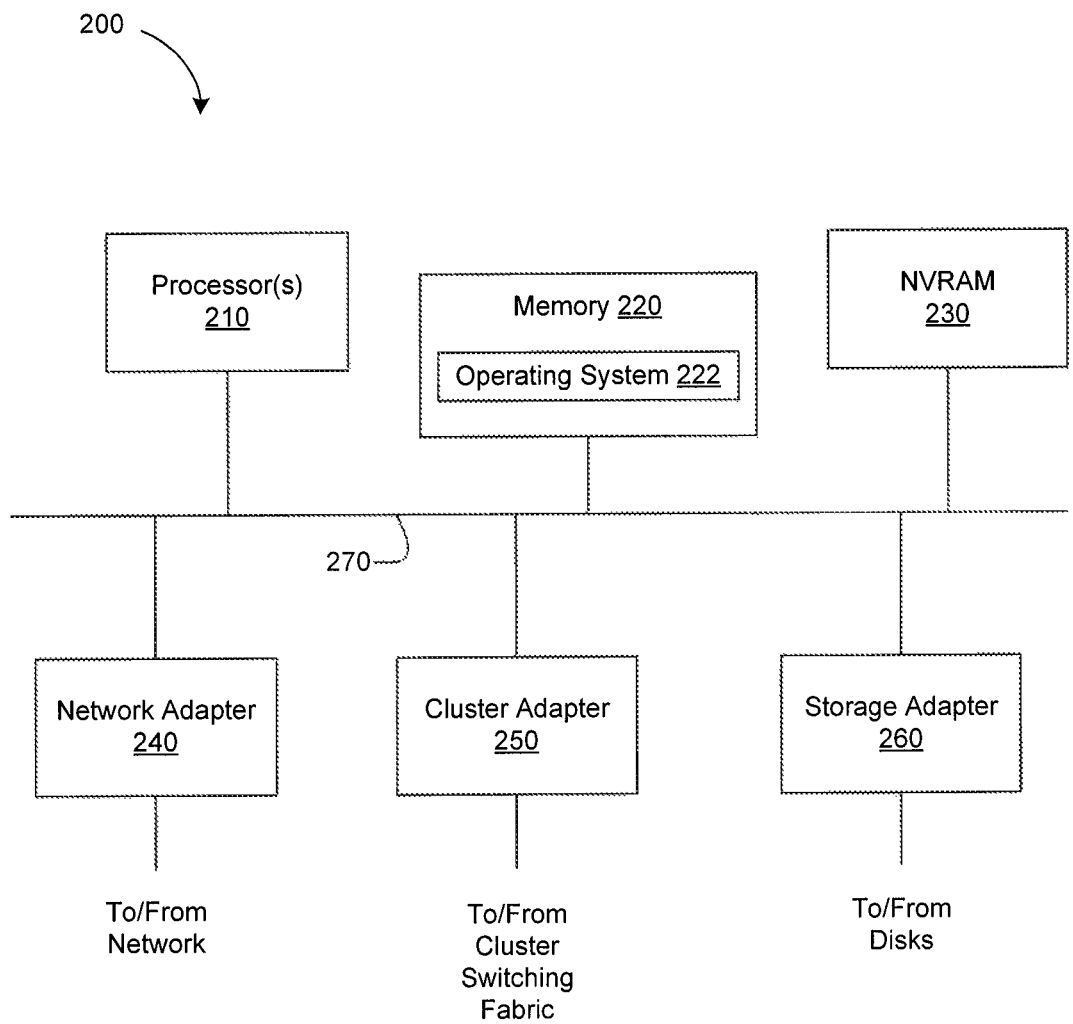
FIG. 2 is a diagram illustrating an example of a storage controller that can implement one or more network storage servers.

FIG. 2 is a diagram illustrating an example of the hardware architecture of a storage controller 200 that can implement one or more network storage servers, for example, storage server 109 of FIG. 1, although alternative configurations are possible. The storage server is a processing system that provides storage services relating to the organization of information on storage devices, such as disks 112 of the shared storage fabric 105. In an illustrative embodiment, the storage server 109 includes a processor subsystem 210 that includes one or more processors. The storage server 109 further includes a memory 220, an NVRAM module 230, a network adapter 240, a cluster adapter 250, and a storage adapter 260, all interconnected by an interconnect 270.

The storage server 109 can be embodied as a single- or multi-processor storage server executing a storage operating system 222 that preferably implements a high-level module, called a storage manager, to logically organize data as a hierarchical structure of named directories, files, and/or data "blocks" on the disks 112.

The memory 220 illustratively comprises storage locations that are addressable by the processor(s) 210 and adapters 240 and 260 for storing software program code and data used to implement the techniques introduced here. The processor 210 and adapters may comprise processing elements and/or logic circuitry configured to execute the software code and manipulate the data structures. The storage operating system 222, portions of which are typically resident in memory and executed by the processing elements, functionally organizes the storage server 109 by (among other functions) invoking storage operations in support of the storage service provided by the storage server 109. It will be apparent to those skilled in the art that other processing and memory implementations, including various computer readable storage media, may be used for storing and executing program instructions pertaining to the techniques introduced here. Similar to the storage server 109, the storage operating system 222 can be distributed, with modules of the storage system running on separate physical resources.

The storage operating system 222 facilitates clients' access to data stored on the disks 112. A non-volatile random access memory (NVRAM) 230 (or cache system) temporarily stores storage data from data access requests received from client systems. In one embodiment, the NVRAM 230 can be implemented as a battery-backed DRAM or as non-volatile solid-state memory, such as flash memory.

The network adapter 240 includes a plurality of ports to couple the storage server 109 with one or more clients 104, and other storage servers, over point-to-point links, wide area networks, virtual private networks implemented over a public network (Internet) or a shared local area network. The network adapter 240 thus can include the mechanical components as well as the electrical and signaling circuitry needed to connect the storage server 109 to the network 106 and/or cluster switching fabric 107. Illustratively, the network 106 and the cluster switching fabric 107 can be embodied as an Ethernet network or a Fibre Channel network. Each client 104 can communicate with storage servers 109 in the clustered storage environment 108 over the network 106 by exchanging packets or frames of data according to pre-defined protocols, such as Transmission Control Protocol/Internet Protocol (TCP/IP).

The cluster adapter 250 includes one or more ports configured to allow access by the storage server to the cluster switching fabric 107 of FIG. 1. The cluster switching fabric 107 enables communication with other storage servers (e.g., local HA partner nodes and/or remote DR partner nodes) and/or clusters such as, for example, cluster 110 of FIG. 1, over point-to-point links, wide area networks, virtual private networks implemented over a public network (Internet) or a shared local area network. In one embodiment, cluster configuration data and/or NVRAM data is mirrored or otherwise replicated using cluster adapter 250. In one embodiment, the cluster adapter 250 is utilized by an N-module and/or a D-module of a storage server to communicate with other N-modules and/or D-modules in a clustered storage system. The network adapter 240 and the cluster adapter 250 may be implemented by a single device in some embodiments. Thus, storage servers 109 forming a disaster recovery group can communicate with each other over the cluster switching fabric 107. In one embodiment, the cluster switching fabric 107 comprises one or more peered connections. Accordingly, storage servers 109 in a disaster recovery group and/or the clusters 110 themselves can communicate with each other using, for example, a configuration replication service or by otherwise passing control information.

The storage adapter 260 cooperates with the storage operating system 222 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 260 includes a plurality of ports having input/output (I/O) interface circuitry that couples with the disks over an I/O interconnect arrangement, such as a conventional high-performance, Fibre Channel link topology.

The storage operating system 222 facilitates clients' access to data stored on the disks 112. In certain embodiments, the storage operating system 222 implements a write-anywhere file system that cooperates with one or more virtualization modules to "virtualize" the storage space provided by disks 112. In certain embodiments, a storage manager 310 (FIG. 3) element of the storage operation system 222 logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical units.

Figure 3:
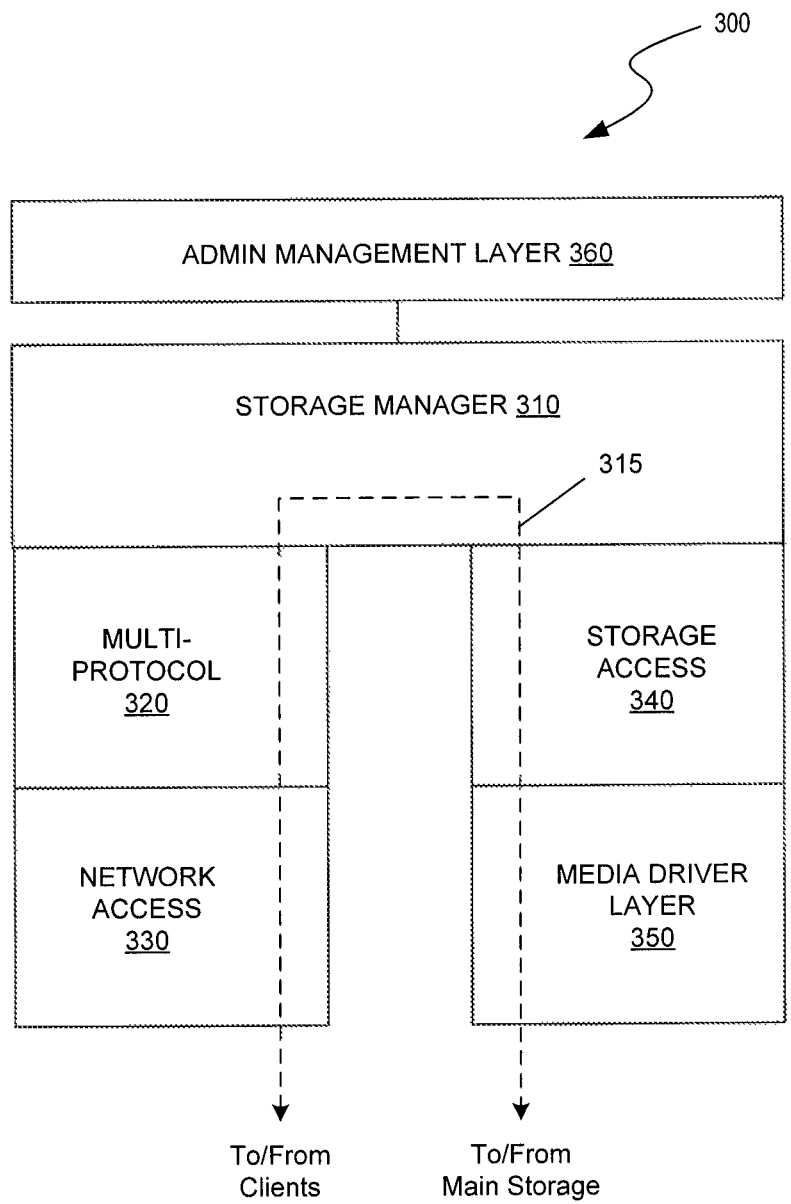
FIG. 3 schematically illustrates an example of the architecture of a storage operating system in a storage server.

FIG. 3 schematically illustrates an example of the architecture 300 of a storage operating system 222 for use in a storage server 109. In one embodiment, the storage operating system 222 can be a version of the NetApp® Data ONTAP™ operating system available from NetApp, Inc., Sunnyvale, Calif., that implements a Write Anywhere File Layout (WAFL™) file system. However, another storage operating system may alternatively be designed or enhanced for use in accordance with the techniques described herein.

The storage operating system 222 can be implemented as programmable circuitry programmed with software and/or firmware, or as specially designed non-programmable circuitry (i.e., hardware), or in a combination thereof. In the illustrated embodiment, the storage operating system 222 includes several modules, or layers. These layers include a storage manager 310, which is the core functional element of the storage operating system 222. The storage manager 310 imposes a structure (e.g., one or more file systems) on the data managed by the storage server 109 and services read and write requests from clients 104.

To allow the storage server to communicate over the network 106 (e.g., with clients 104), the storage operating system 222 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), and/or Internet small computer system interface (iSCSI), to make data stored on the disks 112 available to users and/or application programs. The network access layer 330 includes one or more network drivers that implement one or more lower-level protocols to communicate over the network, such as Ethernet, Internet Protocol (IP), TCP/IP, Fibre Channel Protocol and/or User Datagram Protocol/Internet Protocol (UDP/IP).

Also, to allow the device to communicate with a storage subsystem (e.g., shared storage fabric 105), the storage operating system 222 includes a storage access layer 340 and an associated media driver layer 350 logically under the storage manager 310. The storage access layer 340 implements a higher-level storage redundancy algorithm, such as RAID-4, RAID-5 or RAID DP®. The media driver layer 350 implements a lower-level storage device access protocol, such as Fibre Channel Protocol or small computer system interface (SCSI).

Also shown in FIG. 3 is the path 315 of data flow through the storage operating system 222, associated with a read or write operation, from the client interface to the storage interface. Thus, the storage manager 310 accesses the shared storage fabric 105 through the storage access layer 340 and the media driver layer 350. Clients 104 can interact with the storage server 109 in accordance with a client/server model of information delivery. That is, the client 104 requests the services of the storage server 109, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

The storage operating system 222 includes an administrator management layer 360 that provides a path for a network administrator to request network management operations (e.g., storage system configuration changes, etc.), on the storage system.

Figure 4A:
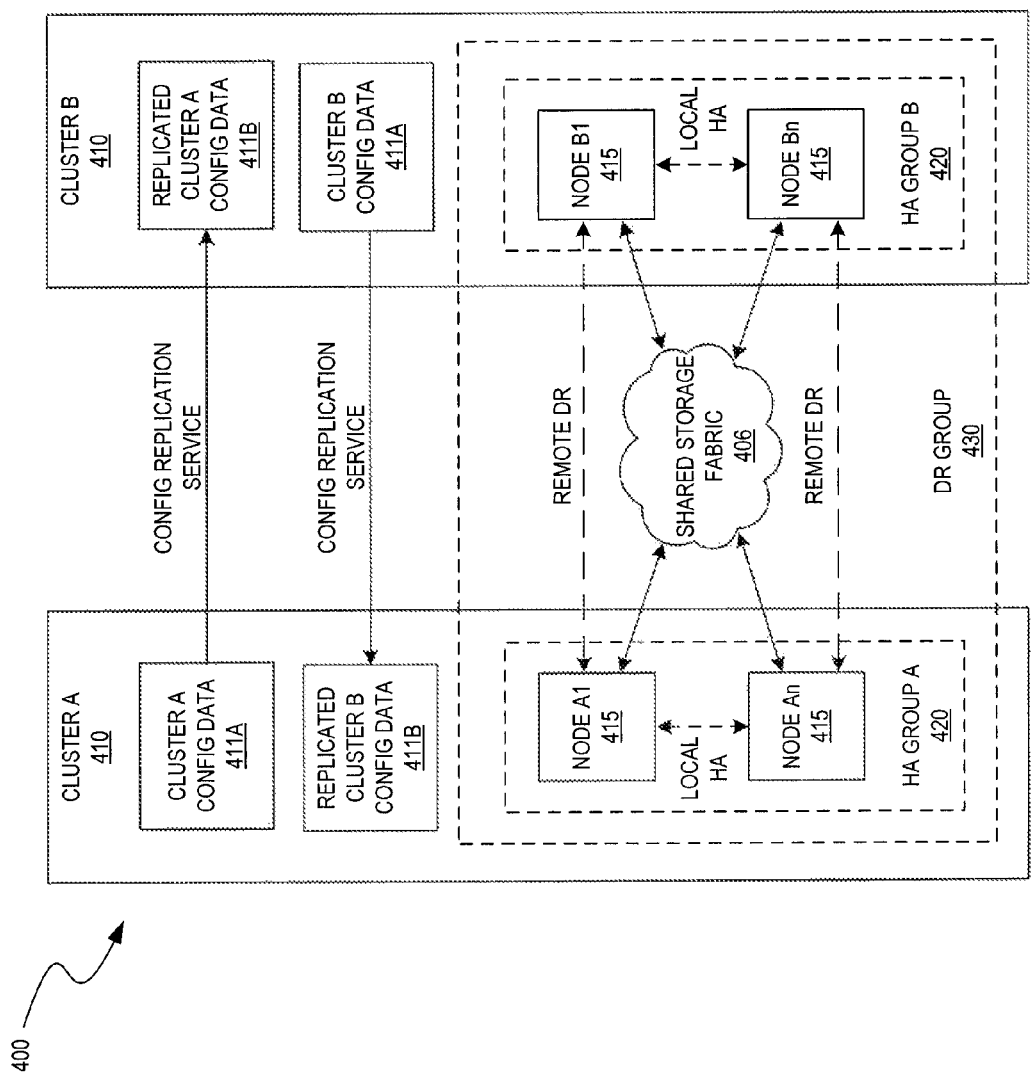
FIG. 4A-4C show an example illustrating a clustered storage environment.
Figure 4B:
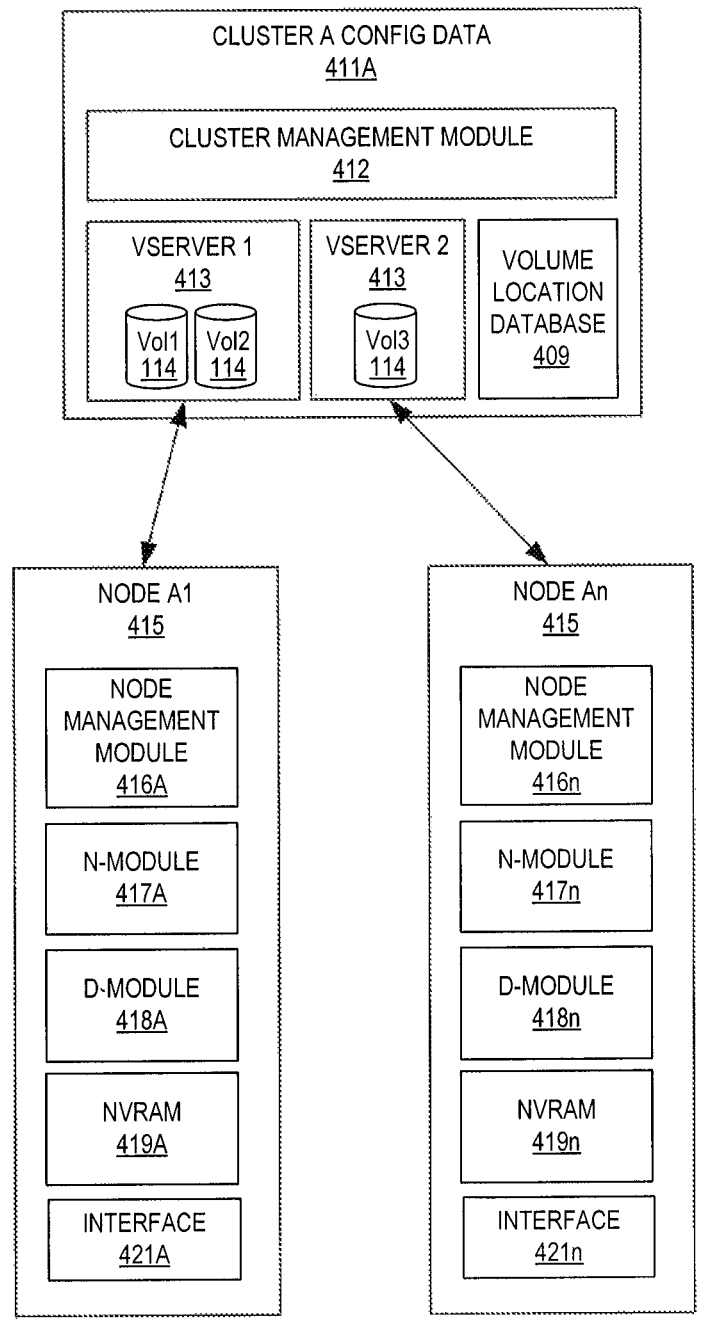
Figure 4C:
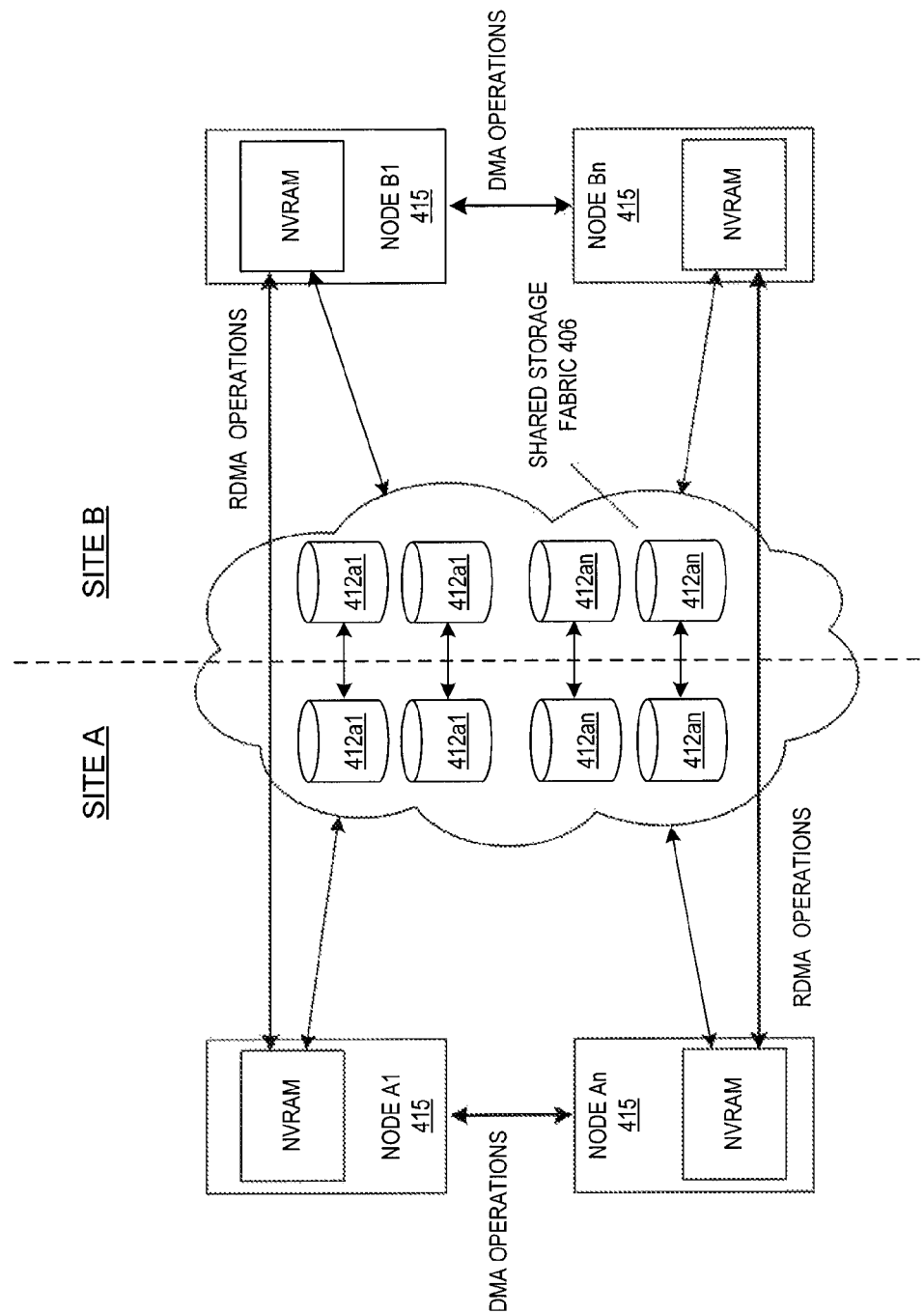

FIGS. 4A-4C show an example of a DR group 430 formed in a clustered storage environment 400. The DR group 430 and/or clusters 410 described herein integrate replication of cluster configuration data 411, data cache or NVRAM data, and storage container or aggregate data resulting in the ability to synchronously failover to a local HA partner or a remote DR partner in the event of a local node failure or cluster disaster, respectively. The structure of the DR group 430 also provides for cluster scalability.

Referring first to FIG. 4A which shows an example of a DR group 430 formed in a clustered storage environment 400, wherein the clustered storage environment 400 includes two clusters 410 such as, for example, clusters 110 of FIG. 1. The clusters 410 (i.e., cluster A and cluster B) are located at a geographically remote locations (i.e., different physical sites). The clusters are typically located at different physical sites so that a disaster at one site in one geographic area does not affect (i.e., render inoperable) the other cluster at the other site in the other geographic area.

In this embodiment, the clusters (i.e., cluster A and cluster B) each include cluster configuration data 411A, replicated cluster configuration data 411B, and two nodes 415. As shown, the clusters 410 include only two nodes for simplicity. The clusters 410 can include any number of nodes 415 and each of the nodes can actively serve data. Further, although a single HA pair is shown in each cluster, the clusters can include any number of HA pairs. Further, in some embodiments, the HA pairs may in fact include more than two nodes 415 (e.g., in this case, HA groups). According to this embodiment, cluster A includes nodes A1 and An configured in a high availability (HA) configuration or group 420. Similarly, cluster B includes nodes B1 and Bn configured in a HA configuration 420. The nodes 415 may be storage servers 109 of FIG. 1, although alternative configurations are possible.

The HA configuration 420 provides a single local partner node for each node in the HA configuration 420. Thus, each node has a local HA partner located at the same site that can take over storage services for the node in the event that the node fails or is disrupted for any reason. A local node failure or disruption can occur for a variety of reasons. For example, software errors or hardware failures at a local node may result in a local node failure or disruption.

The two HA configurations 114 are grouped together to form the DR group 430. In this example, a single DR group 430 is shown for simplicity of discussion. A system can include any number of DR groups. Further, the DR group 430 is configured with four nodes and two HA configurations for ease of design and scalability. In some embodiments, a DR group may include more than four nodes and/or more than two HA configurations. In this example, a single DR group 430 is shown for simplicity, however, cluster A and cluster B may include any number of DR groups formed from HA pairs at each of the respective clusters.

In this example, each node in the DR group 430 is configured with a fibre-channel adapter such as, for example, storage adapter 260 of FIG. 2. Although a fibre-channel adapter is used in this example, any known channel adapter or connection can be used. For example, the DR group 430 can alternatively or additionally be configured with a Serial Attached SCSI (SAS) connection and/or and an Internet Protocol (IP) network connection. In this example, the fibre-channel adapter provides each node in a DR group with access to aggregates (i.e., storage containers/disks 112 in the shared storage fabric 107) owned by other nodes of the DR group. As discussed above, a cluster adapter also provides each of the nodes in the DR group 430 with peered connections to at least its local HA partner and remote DR partner. The connection to the remote DR partner may span a cluster switching fabric such as, for example, the cluster switching fabric 107 of FIG. 1.

In this embodiment, each node in the DR group 430 also includes a storage data buffer. The storage data buffer temporarily stores storage data from data access requests (i.e., write requests) received from clients. In one embodiment, the storage data buffer comprises NVRAM (see, for example, NVRAM 419 of FIG. 4B). The peered connections allow a node in the DR group 430 to replicate its NVRAM data to its local HA partner and a remote DR partner during normal non-failover conditions. For example, when a client write request is received, the data is written to an NVRAM at the appropriate node as well as an NVRAM at a local HA partner node and an NVRAM at a remote DR partner node. Thus, the write request is essentially stored in three places prior to flushing the NVRAM to the appropriate storage containers. The NVRAM replication process is discussed in more detail with respect to FIG. 5.

In one embodiment, the data in the storage data buffer is periodically written to the shared storage fabric 406 of FIG. 4. For example, the data in the storage data buffer may be written to the shared storage fabric every ten to fifteen seconds. The storage server can send a completion response to a client request (e.g., a write request) once the write request is written to the storage data buffer resulting in a quicker client response time.

As shown, cluster A and cluster B each include cluster configuration data 411A and replicated cluster configuration data 411B. The cluster configuration data 411A may be scoped to either a Vserver or a cluster and is replicated to the other cluster via a peered connection. The cluster configuration data can be transferred via, for example, a Configuration Replication Service (CRS). While the cluster configuration data is shown separate from the nodes 415, in some embodiments, the cluster configuration data may be included, in whole or in part, within the nodes 415.

During normal (i.e., non-failover) operation, the paired clusters replicate their configuration data to the other clusters. For example, cluster A replicates cluster A configuration data 411A to cluster B where it is shown as replicated cluster A configuration data 411B. Similarly, cluster B replicates cluster B configuration data 411A to cluster A where it is shown as replicated cluster B configuration data 411B. The cluster configuration data may be replicated based on a change in the configuration data, periodically, and/or in a combination or variety of other ways.

As discussed above, each node 415 in a DR group 430 is assigned one or more storage containers in the shared storage fabric 406. These storage containers are referred to as aggregate containers herein because the storage data contained within the storage containers is replicated to other storage containers (i.e., aggregate mirroring). The storage data may be replicated to other storage containers both locally and cross-site; however, at least one copy of the data must be accessible from each cluster in the event of a cluster failure. In one example RAID SyncMirror is used to accomplish this aggregate mirroring or replication. In the event of a node or cluster failover, any node in a DR group can take ownership of the storage containers previously assigned to its failed HR or DR partner node. For example, in the event of a local node failure, the HA partner node at the same location and in the same cluster as the failed node performs an HA takeover and continues to serve the data for which the local failed node was previously responsible. Likewise, in the event of a full cluster failure, the remote DR partner nodes can take ownership of the remote storage containers previously assigned to their failed DR partner nodes and continue to serve the data the failed nodes were previously responsible for from a remote or destination cluster. In this case, the DR partner node can only take ownership of those storage containers that are available (i.e., those storage containers that are not co-located at the same site as the failed cluster). An example of the cross-site storage container replication via the shared storage fabric 406 is discussed in more detail with respect to FIG. 4C.

FIG. 4B shows a more detailed example of the contents of cluster A of FIG. 4A. In particular, FIG. 4B shows an exploded view of cluster A configuration data 411A and the HA group A 420. In this example, the cluster A configuration data 411A includes a cluster management module 412, two virtual servers 413 (i.e., Vservers 1 and 2), and a volume location database (VLDB) 409.

The virtual servers or "Vservers" are logical storage entities that each act as a physical storage server that can be configured with a logical interface (LIF). The LIF can be, for example, an Internet Protocol (IP) address that is mapped to the IP address of a cluster node. During normal operations, client requests sent to a Vserver's IP address are routed to the appropriate cluster node using the VLDB 409, which is discussed in greater detail below. The cluster node, which is implemented within the clustered storage environment, and has access to all the other cluster nodes in the clustered storage system, can process or service the client requests for the Vserver. In this example, Vserver 1 is mapped to two virtual volumes 114 (i.e., volume 1 and volume 2) and Vserver 2 is mapped to a single virtual volume 114 (i.e., volume 3).

In some embodiments, Vservers can contain one or more virtual volumes each of which can be flexibly configured and resized in the Vserver. The virtual volumes resemble conventional storage entities provided by a physical storage server. The storage for a virtual volume can be provided by one cluster node, or can be stripe-distributed or replicated among multiple cluster nodes. Further, data storage for a virtual volume can be physically moved from one cluster node to another cluster node without changing the virtual volume's configurations. To access a virtual volume's storage, the clustered storage environment accesses the VLDB 409 to determine which node services the data associated with the virtual volume. As shown in the example of FIG. 4B, virtual volumes 1 and 2 map to cluster node A1 and virtual volume 3 maps to cluster node An.

In one embodiment, when a cluster node is replaced with another cluster node during failover, the LIF (e.g., IP address) for the Vserver is not changed, but mapped to the IP address of the replacement cluster node by the cluster management module 412. Thus, in the case of cluster failover, the LIF may be mapped to a remote cluster node (i.e., the remote DR partner) which is located in another cluster. Thus, the configuration data effectively shields the physical implementations and physical characteristics of the Vservers and virtual volumes from the clients.

As discussed above, the HA group A includes two nodes 415 (i.e., node A1 and node A2). Each node comprises a storage server such as, for example storage server 109 of FIG. 1. In this example, nodes A1 and An have a distributed architecture. That is, the nodes A1 and An are designed as a physically separate network module 416 (e.g., "N-blade") and disk module 417 (e.g., "D-blade"). The network module 416 and the disk module 417 communicate with each other over a physical interconnect (not shown). This architecture allows convenient scaling, such as by deploying two or more network modules 416 and disk modules 417 that are all capable of communicating with each other through the interconnect. The nodes A1 and An also include respective NVRAM modules 419A and 419n and respective interface modules 421A and 421n. As previously discusses, the contents of the NVRAM are mirrored during non failover conditions to the NVRAM of a node's local HA partner node and remote DR partner node. According, each of the partner clusters (i.e., HA partner and DR partner) can synchronously failover for a partner node. This mirroring is discussed in more detail with respect to FIG. 4C. In one embodiment, the interface modules 421A and 421n are configured to receive cluster switchover and/or switchback requests.

FIG. 4C shows a more detailed example of the contents of the shared storage fabric 406. More specifically, FIG. 4C shows that each node of the DR group 430 is in communication with all of the storage containers owned by any cluster node in the DR group 430. In this example, only storage containers associated with or owned by cluster node A1 and cluster node An are shown for simplicity. Although not shown, a plurality of storage containers associated with or owned by cluster nodes B1 and Bn can be included in the shared storage fabric 406.

In this example, cluster nodes A1 and An of cluster A are located at a site A and cluster nodes B1 and Bn of cluster B are located at a site B. Site A and site B are located at geographically different locations so that a cluster failure at one of the clusters does not result in a loss of storage services to clients. As shown, the shared storage fabric 406 includes four storage containers assigned to or owned by each cluster node A1 and An. Two of the four storage containers are located at each site. More or fewer storage containers may be used for each site as long as at least one replica of the storage data exists on the storage containers at each cluster 410 to continue storage services in the event of a cluster failure. In one embodiment, the aggregate storage containers are replicated via RAID SyncMirror.

Figure 5:
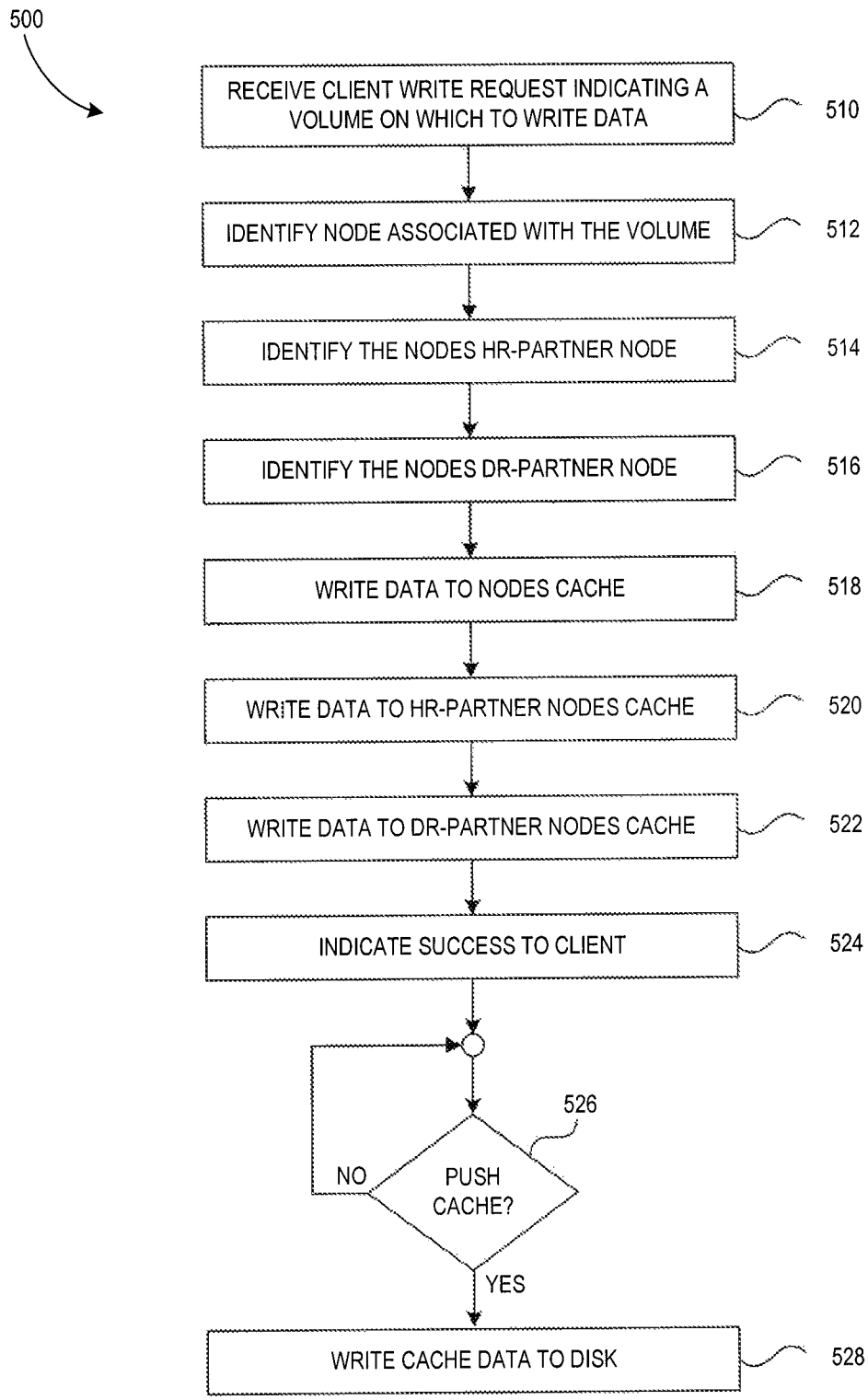
FIG. 5 is a flow diagram illustrating an example process for replicating client access requests to cluster nodes of a DR group.

FIG. 5 is a flow diagram illustrating an example process 500 for NVRAM replication or replicating client write access requests to the various cluster nodes of a DR group, for example, the DR group 430 of FIG. 4. The cluster management module 412 and/or the respective node management modules 416, among other functions, can replicate client write access requests to the various cluster nodes of a DR group. The replication results in mirrored or replicated NVRAM data among HA partner and DR partner nodes.

In the receiving stage, at step 510, the node management module 416 receives a client write request identifying a virtual server and/or a virtual volume on which to write data. In one embodiment, the client request includes a LIF or IP address that routes the request to a management module at a first cluster. In the node identification stage, at step 412, the node management module 416 identifies the appropriate cluster node (i.e., "mapped node") to serve the write request. In one embodiment, the mapped node is determined using the VLDB 409. The VLDB 409 maps each volume to a cluster node in the cluster. Accordingly, using the VLDB 409, the cluster management module can identify the appropriate cluster node to which to send the write request.

In the partner identification stages, at step 514 and 516, the cluster management module identifies the mapped nodes local HA partner node and remote DR partner node, respectively. This information can be stored and managed by the node itself or accessible by the node by accessing the cluster (e.g. the cluster configuration data). In some embodiments, this information can be predetermined during configuration. As discussed above, each DR group is comprised of two HA groups, one HA group from each cluster, resulting in a configuration that provides for synchronous local and cross-site failover capability. Each of the four nodes in the DR group individually services its own clients and data but can additionally take responsibility for DR partner nodes in the event of failures. For example, in the event of a local failure, the HA partner of the failed node takes over responsibility for the failed node. In the event of a cluster failure, the DR partner takes over responsibility for the failed node. Further, in some circumstances a single node of a four node DR group can take responsibility for each of the other nodes in the group. This situation can occur as the result of a cluster failure followed by a local HA partner failure. In the event of a local HA failure followed by a cluster failure, the two online nodes take over responsibility for there respective DR partner nodes as per a usual cluster failover.

In the write stages, at steps 518, 520, and 522, the cluster management module writes the data associated with the client write request to the non-volatile cache memory or NVRAM of the mapped node, the mapped node's HA partner, and the mapped node's DR partner. In one embodiment, steps 518, 520, and 520 occur in parallel. In one embodiment, the write request is processed and multiple DMA and RDMA requests are generated. For example, the cluster management module may generate one or more direct memory access (DMA) transactions to transfer the write data to the NVRAM of the local HA partner. Similarly, the cluster management module may generate one or more remote DMA (RDMA) transactions to also transfer the write data to the NVRAM of the remote DR partner.

In the client response stage, at step 524, the cluster management module indicates a successful transaction to the client. The successful transaction indication response can be sent prior to pushing or writing the NVRAM data out to disk resulting in faster client response times. In the NVRAM write stage, at step 524, the cluster management module waits to push or flush the NVRAM data out to disk. As discussed above, the NVRAM data may be written out to disk periodically, based on an event, etc. In one embodiment, the cluster management module monitors a timer for the write indication. In another embodiment, the cluster management module writes or pushes data out when directed.

Lastly, in the write stage, at step 528, the cluster management module writes the NVRAM cache data out to one or more disks in the shared storage fabric such as, for example, the shared storage fabric 105 of FIG. 1. The preceding steps are described with respect to operation of a cluster management module; however, in some embodiments, the steps may be performed by a cluster management module and/or one or more node management modules.

Figure 6:
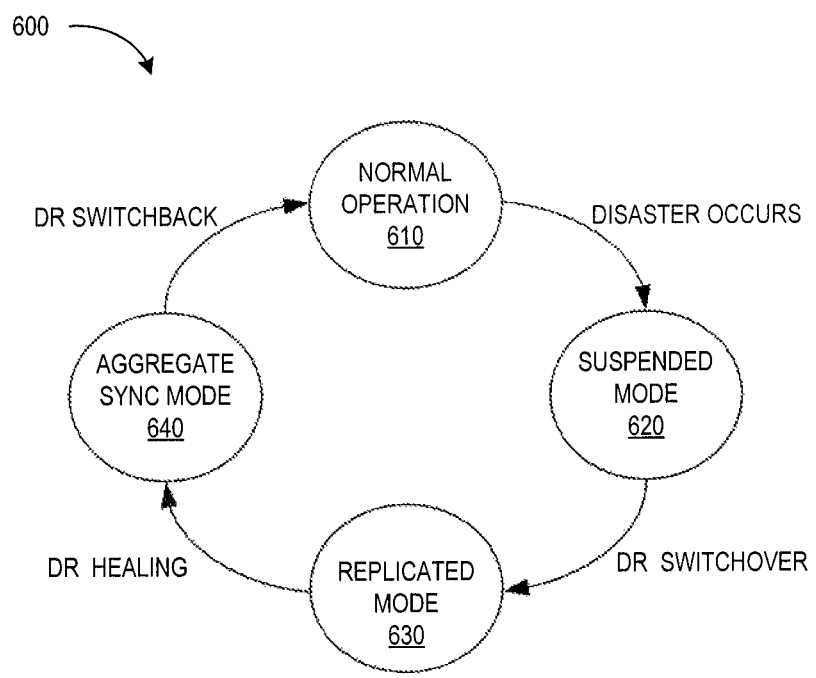
FIG. 6 shows an example illustrating a disaster recovery state diagram.

FIG. 6 shows an example of a disaster recovery state diagram 600. In this example, the disaster recovery state diagram 600 includes a normal operation mode 610, a suspended mode 620, a replicated mode 630, and a synchronization mode 640. The various modes are discussed in FIG. 6 from the perspective of a DR group such as, for example, the DR group 430 of FIG. 4. The DR group includes a source cluster at a first site and a destination (or replicated) cluster at a second geographically different site. The source cluster includes source virtual servers or Vservers which are replicated to the destination cluster during normal operation. The source Vservers may be replicated to the destination Vservers, for example, upon any change or update in the source Vservers. Accordingly, the destination Vservers are synchronously replicated and kept up-to-date with the source Vservers during normal operation. The Vservers may be, for example, Vserver 1 or Vserver 2 of FIG. 4B; although alternative configurations are possible.

During normal operation mode 610, the primary Vservers are active and thus respond to and serve client requests for data by directing client requests to the appropriate source nodes in the source cluster. As discussed above, the primary Vservers are synchronously replicated to the destination cluster. In addition, NVRAM data for each cluster node is replicated both locally to the HA partner node and remotely to the DR partner node. The local HA partner node and the remote DR partner node are also active nodes serving the same or different clients. If a disaster strikes that renders the source cluster inoperable, then a suspended mode 620 is entered. In the suspended mode 620 the primary Vservers are inactive. Because the destination (i.e., replicated) Versers are not yet active, client requests for data are also suspended or inoperable during the suspended mode 620.

A disaster recovery (DR) switchover event transitions the recovery state diagram 600 from the suspended mode 620 to the replicated mode 630. The DR switchover event triggers a cluster-wide switchover command. The DR switchover event may be triggered by an administrator and/or a script operating at the destination cluster. In one embodiment, the DR switchover provides a single command to activate destination Vservers and bring their volumes online after the disaster. In one embodiment, the cluster-wide switchover command can be sent to a single cluster node. In this case, the command is forwarded from one cluster node in the destination cluster to another cluster node in the destination cluster until all of the nodes in the cluster switchover. Alternatively or additionally, the cluster-wide switchover command can be sent to each cluster node.

When a DR switchover event is received at a cluster node, the cluster node in the destination cluster identifies its DR-partner at the inoperable source cluster and assigns ownership of storage containers owned by the identified DR-partner to itself. As discussed above, the shared storage fabric includes a plurality of storage containers that are assigned to each of the cluster nodes. Some of the storage containers are located at the primary site with the primary cluster and some of the storage containers are located at the destination site with the destination cluster. In one embodiment, a RAID SyncMirror ensures that the storage containers are replicated across the sites. Thus, if the primary cluster fails, then so to do the primary storage containers located at the primary site. However, because the storage containers are mirrored to the destination cluster, these storage containers can be taken over or assigned to the DR partner nodes at the destination cluster.

The destination cluster and/or destination cluster nodes activate the destination (i.e., replicated) Vservers and volumes and configuration data at the destination cluster. In one embodiment, the LIFs are brought online at the destination cluster as part of activating the configuration data. The switchover process is discussed in more detail with respect to process 700 of FIG. 7.

Once the DR switchover process is completed, the recovery state diagram 600 enters the replicated mode 630. In the replicated mode 630, the destination Vservers are actively serving client requests from the destination cluster. That is, the destination Vservers and LIFs are activated on the destination cluster and directing client requests previously directed to the primary Vservers at the source cluster to the destination Vservers at the destination cluster. The destination Vservers further direct the client requests (which would have been to a cluster node in the source cluster) to the associated DR-partner nodes in the destination cluster. In the replicated mode 630, the destination (i.e., replicated) configuration data, Vservers and volumes can be modified and/or updated. Additionally, the storage containers in the shared storage fabric can be modified and/or updated by client requests.

Eventually, the primary cluster can power back up and begin the DR healing process which transitions the disaster recovery state diagram 600 from the replicated mode 630 to the synchronization mode 640. During the synchronization mode 640, the storage containers or aggregates are re-synchronized. In one embodiment, the storage containers or aggregates are re-synchronized via RAID SyncMirror technology. At least one copy, but any number of copies, may exist at each site. Additionally, the copies may be stored in any number of storage containers or aggregates. Thus, aggregate healing involves synchronizing the source cluster data in storage containers with the destination cluster data in storage containers. The destination Vservers continue to serve data during the aggregate sync mode 640.

Once aggregate synchronization completes in the synchronization mode 640, a DR switchback event is commenced. Like the DR switchover event, the DR switchback operation may be triggered by an administrator and/or a script operating at the source cluster. The DR switchback process synchronizes destination (i.e., replicated) configuration data, Vservers and volumes between the source cluster and the destination cluster. That is, the source cluster updates the source configuration data, Vservers and volumes with any changes that occurred in the destination configuration data, Vservers and volumes. In one embodiment, the DR switchback provides a single command to synchronize and activate source Vservers and configuration data and bring the associated volumes back online after the disaster. In one embodiment, the cluster-wide switchback command can be sent to a single source cluster node. In this case, the command is forwarded from one cluster node in the source cluster to another cluster node in the source cluster until all of the nodes in the source cluster switchback. Alternatively or additionally, the cluster-wide switchback command can be sent to each cluster node individually. The switchback process is discussed in more detail with respect to process 800 of FIG. 8.

Once the DR switchback operation is complete, the recovery state diagram 600 can transition back to normal operation mode 610 and resume serving client requests at the source cluster.

Figure 7:
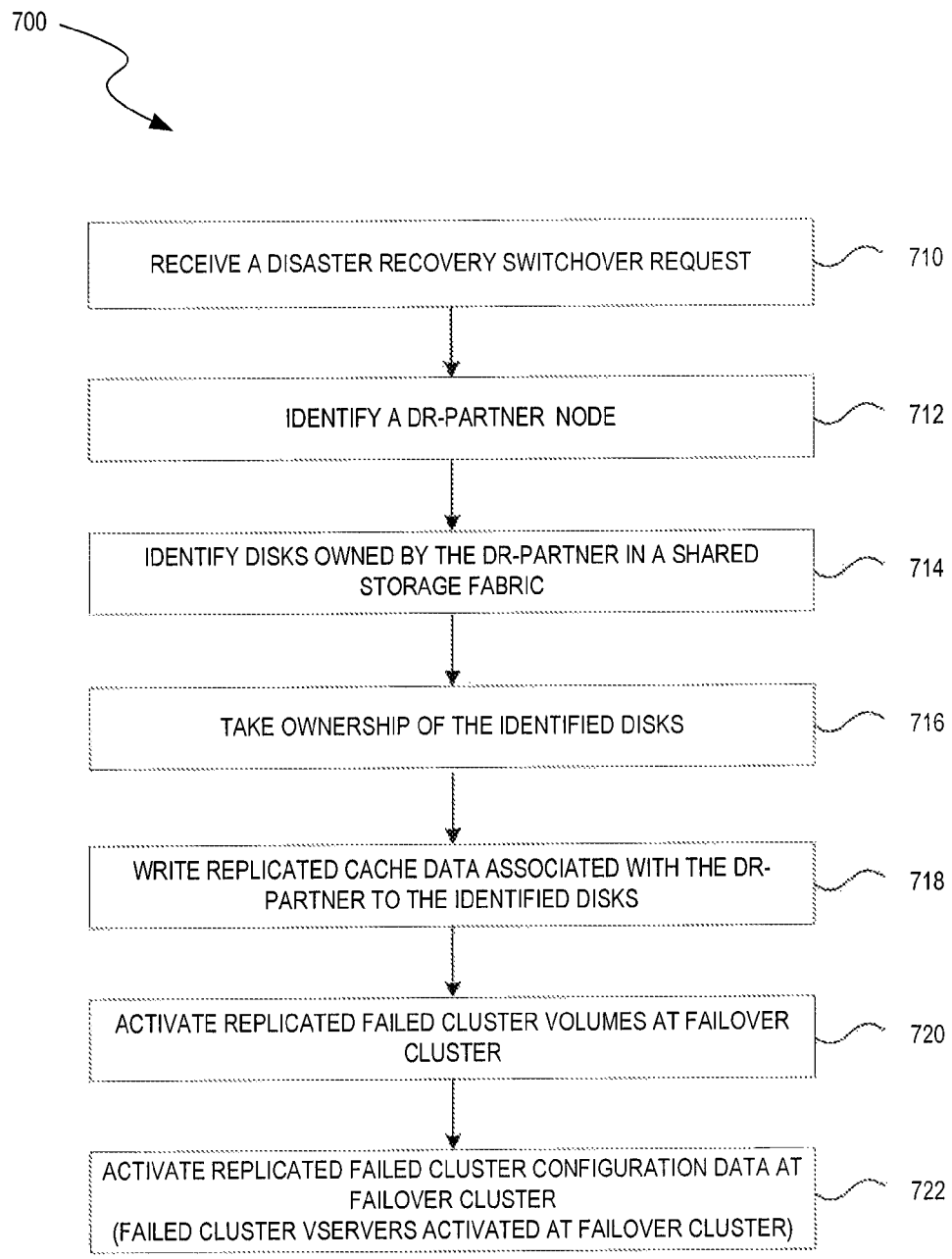
FIG. 7 is a flow diagram illustrating an example switchover process in a disaster recovery state diagram.

FIG. 7 shows an example illustrating a switchover process 700 in a disaster recovery state diagram such as, for example, disaster recovery state diagram 600. A node management module, among other functions, can perform the switchover process 700 for a failover node. The switchover process results in the ability to service client requests directed to a failed node at the failover node.

In the receiving stage, at step 710, the node management module receives a disaster recovery switchover request indicating the intent by a failover cluster to resume serving client requests previously served by a source cluster from the failover cluster. In one embodiment, the disaster switchover request indicates to that a node should, in addition to servicing its current clients, resume service for clients of its DR partner node.

In the partner identification stage, at step 712, the node management module identifies its remote DR partner node in the failed cluster. In one embodiment, partner information is stored and managed by the node itself or is accessible via the cluster management module (e.g. from the cluster configuration data). As discussed above, each DR group is comprised of two HA groups, one HA group from each cluster, resulting in a configuration that provides for synchronous local and cross-site failover capability. Each of the four nodes in the DR group individually services its own clients and data but can take additional responsibility for partner nodes in the event of failures. Further, in some circumstances a single node of a four node DR group can take responsibility for each of the other nodes in the group. This situation can occur, for example, as the result of a cluster failure followed by a local HA partner failure.

In the disk identification stage, at step 714, the node management module identifies disks owned by the DR partner node in the failed cluster. As discussed, only the disks located at the failover cluster are available when the source cluster is down. That is, each node in the clustered storage environment is associated with or assigned a number of storage containers. A copy of the data stored in the storage containers must be replicated at both a first site (e.g., destination or failover cluster) and a second geographically different site (e.g., source cluster of failed cluster) so that the data is accessible during a cluster failure or outage. Accordingly, during the disk identification stage only those disks at the destination or failover cluster are available. In this example, the disks containing a copy of the data (i.e., the original data) are located at the source or failed cluster.

In one embodiment, the ownership information of the each of the disks is stored on the disks or aggregates themselves. In this case, the node management module reads the ownership information of the various disks related disks in the shared storage fabric to identify those disks owned by its DR partner node in the failed cluster. In one embodiment, the disk ownership information is tracked and kept up to date by the failover node. In the assignment stage, at step 716, the node management module assigns ownership of the identified disks to itself (i.e., the failover node).

In the cache write stage, at step 718, the node management module writes replicated cache data from a cache system in the takeover or failover node to disk. The replicated cache data is associated with the failed DR partner node in the failed cluster. This data is synchronously transferred to the cache system during normal non-failover conditions (e.g., prior to cluster failover).

Lastly, in the activation stages, at steps 720 and 722, the virtual volumes and virtual servers are brought online, respectively. In one embodiment, bringing the virtual servers or Vservers online activates the LIFs, and thus resumes the ability client to service client storage access requests. In embodiment, the activation stage is initiated and/or performed by the node management module.

The preceding steps are described with respect to operation of a node management module; however, in some embodiments, the steps may be performed by a cluster management module and/or a node management module.

Figure 8A:
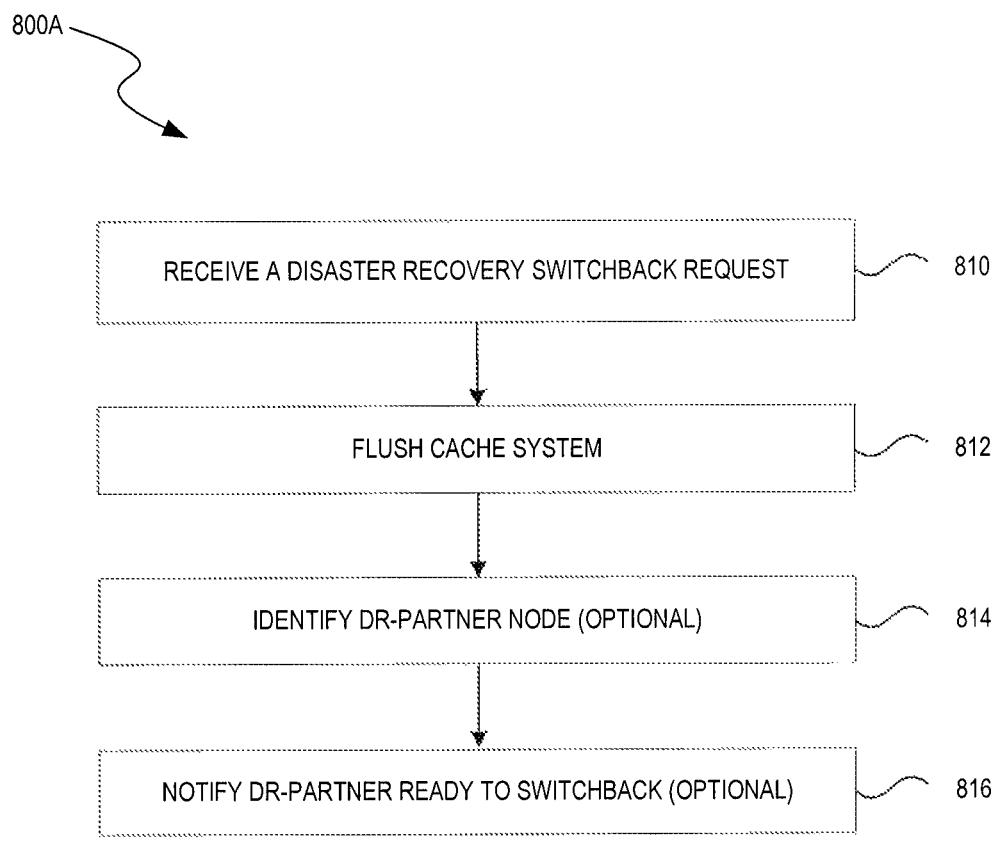
FIGS. 8A and 8B are flow diagrams illustrating an example switchback process in a disaster recovery state diagram.
Figure 8B:
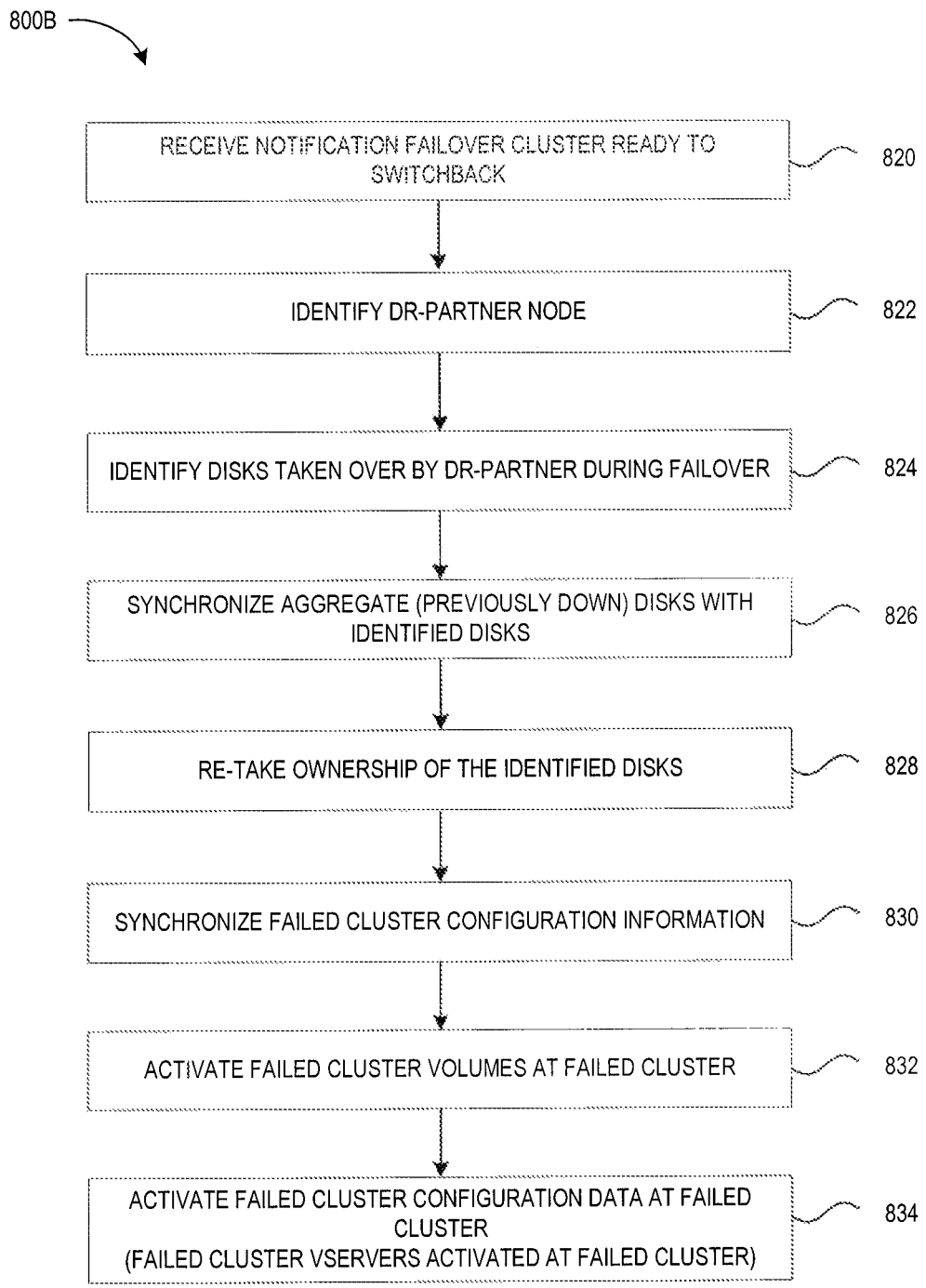

FIGS. 8A and 8B show an example illustrating a switchback process 800A and 800B from the perspective of a failover node or cluster and a failed node or cluster, respectively, in a disaster recovery state diagram such as, for example, disaster recovery state diagram 600. The switchback processes 800A and 800B together result in the ability to resume client requests in a (previously) failed cluster or node.

Referring first to FIG. 8A which illustrates the switchback process 800A. A cluster management module and/or a node management module at the failover node can perform the switchback process 800A. In the receiving stage, at step 810, the node management module receives a disaster recovery switchback request indicating the intent by the failover cluster to stop serving client requests served by the failover node in the failover cluster and resume serving client request at the previously failed node in the failed cluster. In one embodiment, the switchback request can be generated by an administrator or automatically generated by scripts running at either the failover or failed cluster.

In the cache write stage, at step 812, the node management module writes or flushes in-flight cache data in the cache system to the disks located at the failover cluster that were taken over from the failed node by the failover node during the failover process. This is to ensure that all in-flight data is updated in the disks prior to the failed node resuming operation.

In the partner identification stage, at step 812, the node management module identifies its remote DR partner node in the failover cluster. In one embodiment, partner information is stored and managed by the node itself or is accessible via the cluster management module (e.g. from the cluster configuration data). As discussed above, each DR group is comprised of two HA groups, one HA group from each cluster, resulting in a configuration that provides for synchronous local and cross-site failover capability. Each of the four nodes in the DR group individually services its own clients and data but can take additional responsibility for partner nodes in the event of failures.

Lastly, in the notification stage, at step 816, the node management module notifies the failed cluster or node that all the cache has been flushed. In one embodiment, the notification is optional as the failed cluster may assume that all disks are up-to-date after a specified period or may poll the failover cluster or node for completion.

FIG. 8B illustrates the switchback process 800B from the perspective of the failed node or cluster (or previously failed node or cluster). A cluster management module and/or a node management module at the failed node can perform the switchback process 800B. In the notification reception stage, at step 820, the node management module receives notification from its DR-partner or the failover cluster that the cluster is prepared to switchback.

In the partner identification stage, at step 822, the node management module identifies its remote DR partner node in the failed cluster. In one embodiment, partner information is stored and managed by the node itself or is accessible via the cluster management module (e.g. from the cluster configuration data). As discussed above, each DR group is comprised of two HA groups, one HA group from each cluster, resulting in a configuration that provides for synchronous local and cross-site failover capability. Each of the four nodes in the DR group individually services its own clients and data but can take additional responsibility for partner nodes in the event of failures.

In the disk identification stage, at step 824, the node management module identifies disks owned by the DR partner node in the failover cluster that were taken over during failover. As discussed, during failover, only the disks located at the failover cluster are available when the source cluster is down. These are the disks that are taken over. During switchback, the aggregates located at the failed cluster are brought back online. However, the aggregates can be out of date with the disks that were taken over by the DR partner node in the failover cluster during the failover process. As discussed, each node in the clustered storage environment is associated with or assigned a number of storage containers. A copy of the data stored in the storage containers must be replicated at both a first site (e.g., destination or failover cluster) and a second geographically different site (e.g., source cluster of failed cluster) so that the data is accessible during a cluster failure or outage.

In the disk synchronization stage, at step 826, the node management module synchronizes local copies of the aggregates that were previously offline with the identified disks. After synchronization, the copy of the data stored in the storage containers at the first site (e.g., destination or failover cluster) and the copy stored at the second geographically different site (e.g., source cluster of failed cluster) are synchronized. In one embodiment, the synchronization step can be performed at the failover node. In one embodiment, the synchronization step can occur prior to a switchback command being issued.

In the ownership stage, at step 828, the node management module re-takes ownership or assigned ownership of the identified disks or aggregates back to the failed cluster node. In one embodiment, the ownership information of the each of the disks is stored on the disks or aggregates themselves. In this case, the node management module modifies the ownership information of the various disks related disks in the shared storage fabric to take ownership of those disks.

In the configuration synchronization stage, at step 830, the node management module synchronizes its configuration data with the configuration data that is replicated to the failover node during normal non-failover conditions. The replicated configuration data can be modified and/or adjusted when the failed node is offline. Thus, after coming back online, the configuration information must be synchronized. In some embodiments, the configuration synchronization stage, step 830, can occur at any point subsequent to the partner identification stage, at step 822.

Lastly in the activation stages, at steps 832 and 834, the virtual volumes and virtual servers are brought online, respectively, at the (previously) failed node. In one embodiment, bringing the virtual servers or Vservers online activates the LIFs, and thus resumes the ability client to service client storage access requests. In embodiment, the activation stage is initiated and/or performed by the node management module.

The preceding steps are described with respect to operation of a node management module; however, in some embodiments, the steps may be performed by a cluster management module and/or a node management module.

Cache Management

As discussed above, the network storage systems and/or network storage environments described herein can include one or more types of mass storage devices for storing data such as, for example, storage devices (or storage containers) 112 of FIG. 1. Additionally, nodes of the network storage system often include temporary storage which is used as a write cache (e.g., NVRAM 230 of FIG. 2) for data which has been written to the network storage system, but has not yet been written to the mass storage.

Write caches can improve network storage system performance and reduce response times. Data associated with one or more write requests is accumulated in the write cache before being written to the mass storage. Because the write cache typically includes memory with lower latency than the mass storage, the write cache enables the storage system to confirm write operations to the requesting client more quickly. In addition, consolidating individual write requests in the write cache and periodically flushing them to the mass storage in an aggregated fashion enables the network storage system operate more efficiently. Write caches cam be implemented using solid state memory, such as NVRAM. The term NVRAM may be used herein to describe the temporary storage of server nodes for purposes of illustration. Implementation of the temporary storage of the server nodes using other types of storage or memory devices, including combinations, is possible. Therefore, the term NVRAM is not to be interpreted as limiting the descriptions or examples herein to any particular memory or storage technology.

In some cases, the data which is stored in NVRAM and has not yet been written to mass storage may also be referred to as a non-volatile log (NVLog). The NVLog may include the data associated with a client request as well as other data including metadata. The metadata may include information used to identify, track, locate, and/or manage the data. In addition the NVRAM may also be used for storing other data relating to the operation of the server node of the network storage system. When discussing mirroring of the NVRAM in the examples herein, reference is primarily made to the portion of the NVRAM used to store the NVLog. Mirroring the NVRAM does not necessarily require mirroring of every memory location of the NVRAM. The terms NVRAM, NVLog, and temporary storage, are used interchangeably herein to refer to data which a storage server or node has received in conjunction with a write request, but has not yet been flushed to the mass storage of the system.

As discussed, in clustered storage systems, the multiple storage server nodes of one cluster can be combined into one or more HA groups. These nodes are often configured such that they can each access the same bank(s) of mass storage. Consequently, each node of an HA group can take over for others in the event of a node failure or required downtime. The nodes of a HA group are often located at the same geographic location or physical location minimizing the burdens of maintaining high speed communication links between the nodes.

Additional clusters of storage nodes may be configured in their own HA groups. The clusters may be configured such that they are able to take over for one another in the event of a failure or other unavailability (i.e., a failover). In this way, the nodes of a first HA group and the nodes of a second HA group are operated as a group which is configured to provide continued operation and data protection in the event of a disaster affecting one of the clusters (i.e., the HA groups are operated as a DR group).

Figure 9:
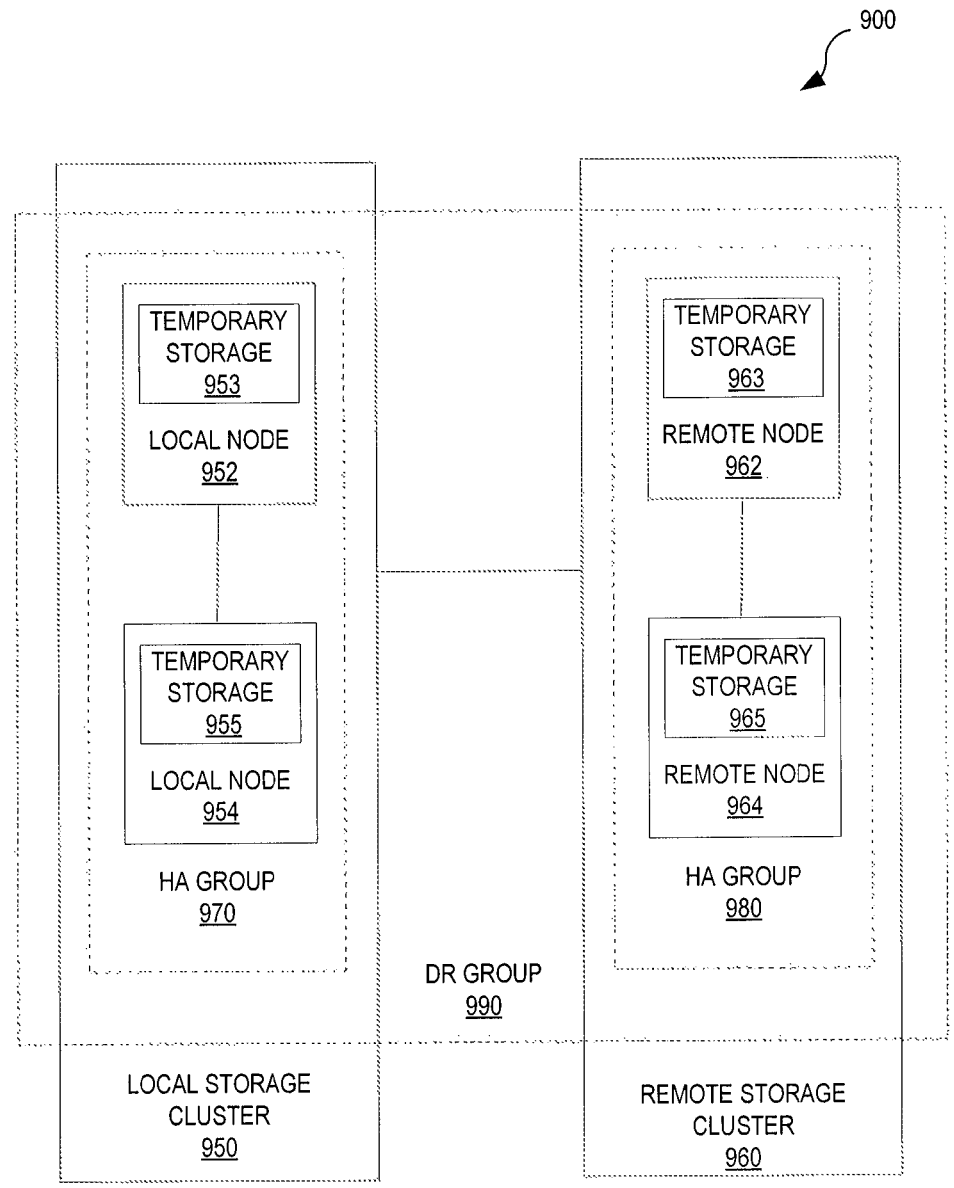
FIG. 9 illustrates a network storage system in which some embodiments of the present invention may be utilized.

The cache management improvements described herein are discussed in greater detail in the context of the network storage system 900 of FIG. 9 although the improvements are applicable to other types of storage systems and storage system architectures. Network storage system 900 includes local storage cluster 950 and remote storage cluster 960. Local storage cluster 950 and remote storage cluster 960 are examples of the storage server clusters of previous figures and may also includes other devices, systems, or functions.

In this example, each of local storage cluster 950 and remote storage cluster 960 includes two storage nodes. Local storage cluster 950 includes local node 952 and local node 954. Each local node may be a storage server, a filer, or a device which provides similar storage operation functions. Each of local nodes 952 and 954 include temporary storage. As described above, this temporary storage may be used for, among other things, storing data which has been written to network storage system 900 but has not yet been flushed to a mass storage device or system (not shown). This function is also sometimes referred to as write caching. The temporary storage of the nodes may also function as a read cache in some cases.

Local nodes 952 and 954 are configured to operate together in a logical group, HA group 970. Each of the local nodes is capable of performing most, if not all, of its peer's functions. This failover capability is typically invoked if the peer is subject to scheduled or unscheduled downtime. HA group 970 is operated in a manner such that clients of local storage cluster 950 experience minimal or no disruption if either local node 952 or local node 954 is not operational. Similarly, remote storage cluster 960 includes multiple nodes which are operated as an HA group. HA group 980 includes remote node 962 and remote node 964. HA group 980 may also include other nodes or devices.

HA group 970 and HA group 980 also comprise disaster recovery (DR) group 990. Each HA group is configured to perform the operations of the other if the other fails or is unavailable for some other reason. DR group 990 may also contain additional HA groups.

Figure 10:
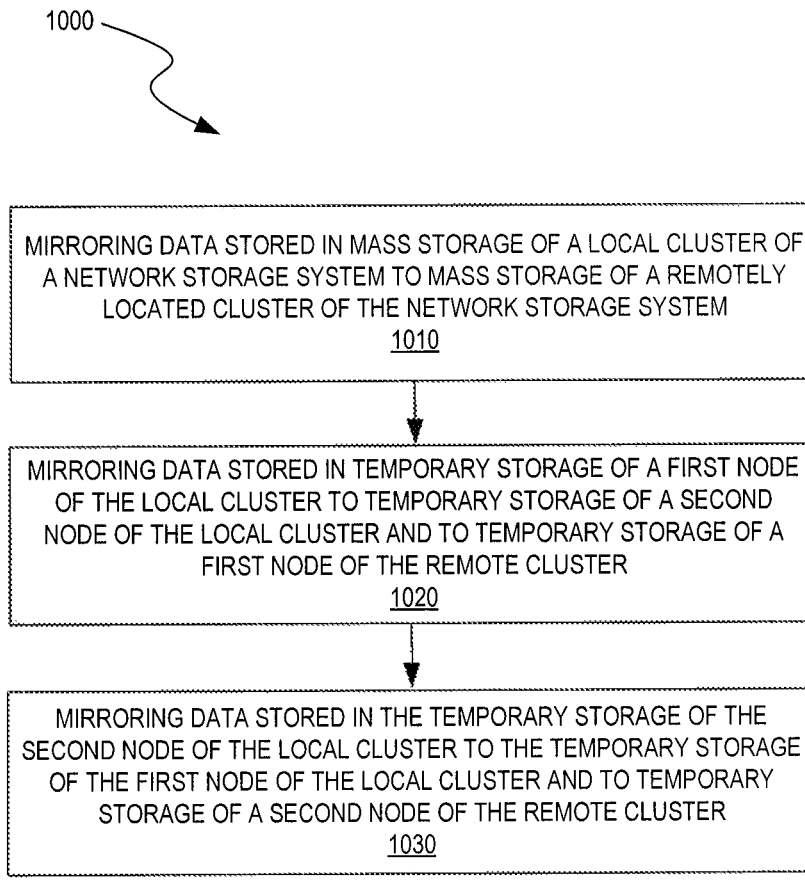
FIG. 10 illustrates an example of a method of operating a network storage system.

FIG. 10 illustrates an example method 1000 of operating network storage system 900 of FIG. 9. Method 1000 includes mirroring data stored in mass storage associated with local storage cluster 950 to mass storage associated with remote storage cluster 960 (step 1010). Method 1000 also includes mirroring data stored in temporary storage 953 of local node 952 of local storage cluster 950 to temporary storage 955 of local node 954 of local storage cluster 950 and to temporary storage 963 of remote node 962 of remote storage cluster 960 (step 1020). Method 1000 also includes mirroring data stored in temporary storage 955 of local node 954 of local storage cluster 950 to temporary storage 953 of local node 952 of local storage cluster 950 and to temporary storage 965 of remote node 964 of remote storage cluster 960. The temporary storage of each of the local nodes is not mirrored to temporary storage of all of the remote nodes of the remote cluster.

Figure 11A:
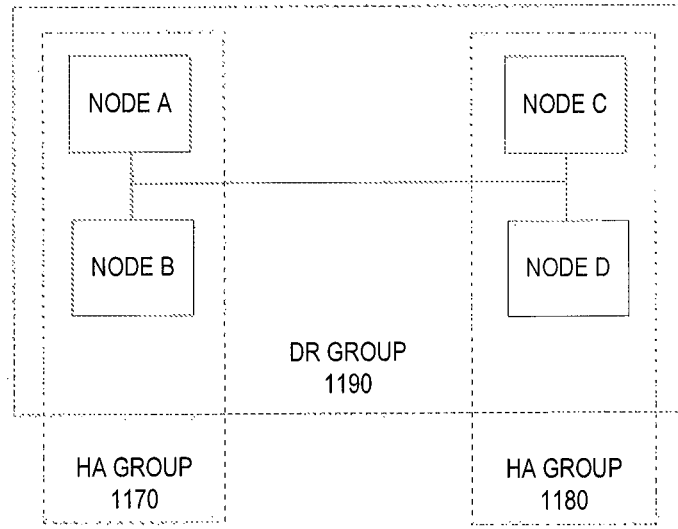
FIG. 11A illustrates a network storage system in which some embodiments of the present invention may be utilized.
Figure 11B:
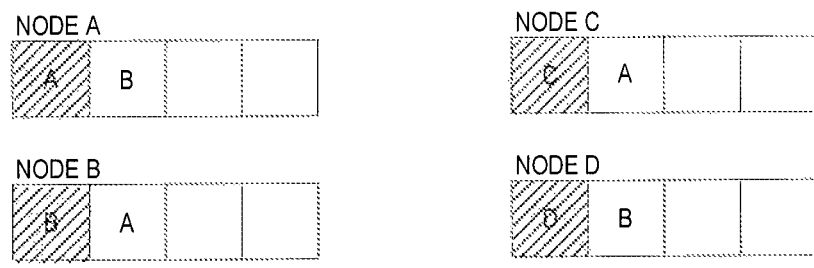
Figure 11C:
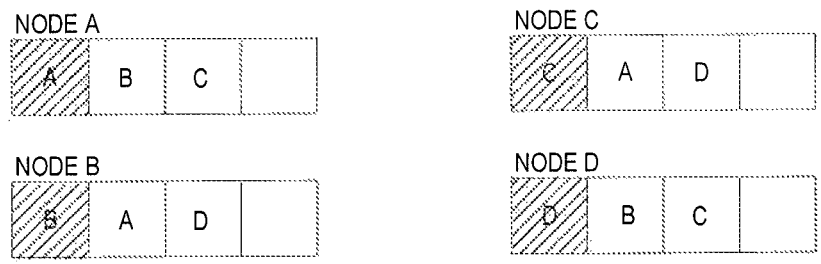

FIGS. 11A-11C illustrates a network storage system in which method 1000 of FIG. 10, or a similar method, may be utilized. FIG. 11A includes a simplified illustration of the network storage system of FIG. 9. The local nodes and remote nodes of FIG. 9 are represented in FIG. 11A by node A, node B, node C, and node D for purposes of illustration. Node B may be referred to as a HA partner of node A, while node C may be referred to as a DR partner of node A.

FIG. 11B illustrates mirroring of NVRAM of the nodes of a HA group 1170 of the network storage system of FIG. 11A. Prior to execution of method 1000, the temporary storage of each node contained its own NVLog. The shading illustrates the initial contents of the temporary storage of each of the nodes (i.e., before executing the method the NVRAM of node A contained the NVLog for node A but did not contain the NVLogs of other nodes). After executing method 1000, nodes B and C contain a mirror of the NVLog of node A and nodes A and D contain a mirror of the NVLog of node B. Node B is node A's HA partner within HA group 1170 and node C is node A's DR partner within DR group 1190.

FIG. 11C illustrates mirroring of NVRAM when method 1000, or a similar method, is also applied to HA group 1180. After execution, each of the nodes in DR group 1190 includes its own NVLog as well as a mirror of the NVLog of two other nodes. In other words, the temporary storage of each of the nodes includes a mirror of the NVLog of its HA partner and its DR partner. Consequently, the NVLog of any of the four nodes it available in at least three nodes of the network storage system.

In order to be effective in recovering from a failure, the mirroring of the NVLogs must be maintained such that every change to a primary NVLog is reflected in its mirrors. The present invention optimizes the mirroring process and minimizes use of system resources and bandwidth by mirroring the NVLog of each node to only one HA partner and one DR partner rather than mirroring to all other nodes of the DR group. However, this approach still allows for recovery from a wide range of failure scenarios as will be illustrated in subsequent examples. This is accomplished by continuing the mirroring process according to the method after one or more nodes have failed or become unavailable.

The NVLogs and theirs mirrors are illustrated as being stored in separate, sequential segments of the temporary storage of each node. This is one possible configuration. The memory which makes up the temporary storage of each node may be organized in many ways and the information stored therein, including NVLogs and mirrors of NVLogs, may be distributed throughout the memory in a variety of ways.

In some cases, the mirroring steps of method 1000 illustrated in FIG. 11A-C will occur in a synchronous manner. In this case, the mirroring of the NVLog of node A to nodes C and D will occur simultaneously such that the copies of the NVLogs at the other nodes are always identical. In addition, the mirroring processes may be an atomic process. In this case, the mirroring operation(s) will not be deemed complete until each of the mirroring steps is confirmed to have completed successfully. If one of the steps is not successfully completed, each of the temporary storage locations or the NVLogs stored therein will be returned to their state just prior to the unsuccessful mirroring operation.

Figure 12:
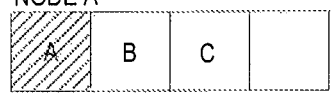
FIG. 12 illustrates a response to a failure of a node in a network storage system.
Figure 12:
Figure 12:
Figure 12:
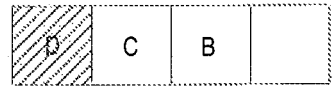
Figure 12:
Figure 12:
Figure 12:
Figure 12:
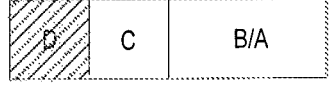

FIG. 12 illustrates a response to a failure of one of the nodes of a network storage system in a further example of the invention. As illustrated in FIG. 11A-C, under normal operation each node of the system contains its own NVLog as well as those of two of the other nodes of the system. When a single node fails, operations associated with that node are failed over to the corresponding HA partner node.

In the illustration of FIG. 12, node A fails or becomes otherwise unavailable for operation. Consequently, node A is failed over to node B. Because node A and node B are both able to access the same mass storage, node B is able to continue performing operations which would have previously been handled by or directed to node A. Consequently, the temporary storage of node B becomes the primary storage location for the NVLog associated with both node B and node A. This NVLog is designated "B/A" in FIG. 12. The temporary storage of node B already included the NVLog of node B and included a mirror of the NVLog of node A at the time of node A's failure. In FIG. 12, the entirety of the B/A NVLog in node B is now highlighted because it is the primary instance of that NVLog for both nodes during the failover.

Even though a failover has occurred, the network storage system continues operation and the NVLog mirroring process continues, to the extent possible, for the remaining nodes. For example, the NVLog now associated with nodes B and A which resides in the temporary storage of node B is mirrored to its DR partner node D. It cannot be mirrored to its HA partner, node A, because it is unavailable. Similarly, the NVLog which was associated with node A is deleted from the temporary storage of node C because node A is not operational and node C does not currently have a DR partner. In this single node failure scenario, a mirror of each of the NVLogs is still maintained in at least one other location such that system can still likely recover from an additional failure without loss of NVLog data.

For purposes of illustration, FIG. 12 depicts the local storage of each node being divided into four equal portions with NVLogs of the various nodes separately occupying those portions. However, the NVLogs may be distributed throughout the temporary storage of the node in a variety of manners. In some cases, the temporary storage of a node may include multiple storage devices or may include storage devices of multiple types.

When node A becomes operational, the temporary storage of each node is restored to the normal operation state illustrated in FIG. 12. This is accomplished by node B returning the node A portion of the B/A NVLog to node A. At this point nodes A and B continue mirroring their respective NVLogs as described in method 1000. Node C also returned to mirroring its NVLog to node A.

Figure 13:
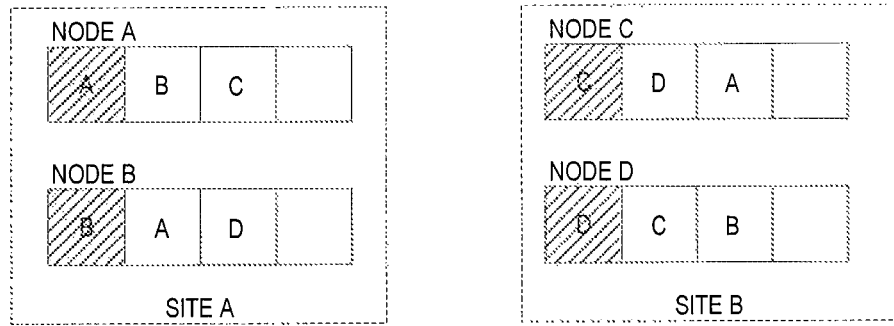
FIG. 13 illustrates responses to successive failures of nodes in a network storage system.
Figure 13:
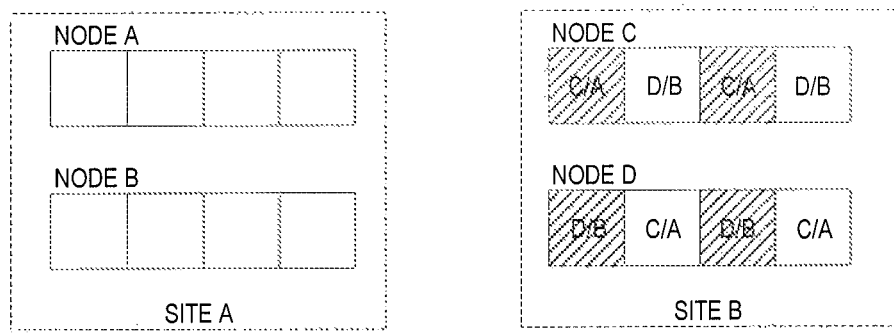
Figure 13:
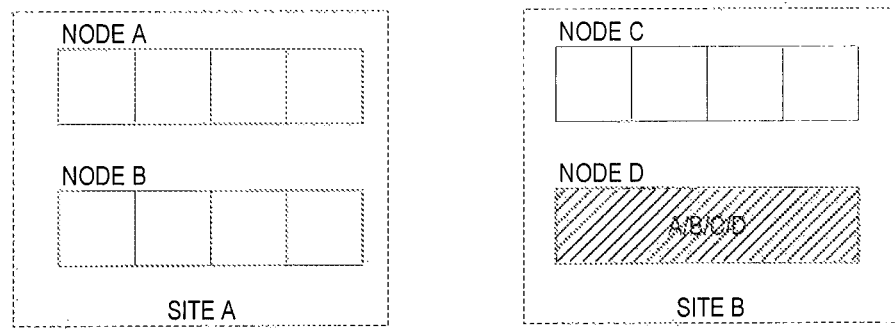

FIG. 13 illustrates a response to a failure of two nodes of a network storage system according to one aspect of the invention. As in previous examples, the NVLog of each node is mirrored to two other nodes in normal operation. In one failure scenario, nodes A and B simultaneously fail or are taken offline. This may be due to a disaster or other event which affects an facility in which nodes A and B are located or all of site A. This failover mode of operation is referred to as DR mode because both node A and node B have been failed over to their respective DR partners at site B. There is no data loss due to the failure because the NVLogs of nodes A and B were being mirrored to nodes C and node D, respectively, at the time of failure.

After the failover, node C is now responsible for handling its own operations as well as those previously associated with node A. This is possible, in part, because the mass storage used by nodes A and B at site A was also being mirrored to mass storage at site B. In some examples, the mass storage may not be located at site A or site B and may be located at another location accessible by both nodes A and C. Because node C is now also managing operations previously associated with node A, the node C temporary storage includes NVLog information associated with both nodes which is designated as "C/A."

Both portions of the C/A NVLog are mirrored to node D because the entire NVLog for which a node has primary responsibility is mirrored to its HA partner, if available. The two portions of the C/A NVLog are illustrated as being in non-contiguous portions of the NVRAM of node C. This is due to the fact that the second segment of the temporary storage of node C was already occupied by the mirror of the NVLog of node D. The illustrated order or arrangement of the NVLogs and mirrors of NVLogs in each node may vary. The stored information may be distributed throughout the NVRAM in many different ways.

Similar to the failover of node A to node C described above, node B is failed over to node D due to the event at site A. The temporary storage of node D already contained a mirror of node B's NVLog and is now responsible for managing operations which were previously handled by or directed to node B. Node D has primary responsibility for the newly combined D/B NVLog and mirrors it to the temporary storage of node C.

FIG. 13 further illustrates how the NVLogs are handled if another failure occurs before nodes A and B are returned to service or have other nodes substituted for them. In this example, node C fails while node A and node B were failed over to node C and node D. Upon failure, the network storage system fails over node C to node D, including the responsibilities associated with node A which were temporarily held by node C. Node D is able to continue operations and continue responding to requests originally associated with any of the four nodes. Node B includes NVLogs associated with all four nodes even though it did not include all of those NVLogs during normal operation. This is the case because the method of the present invention was applied to the C/A NVLog of node C after the failure of node A.

It should be understood that each time the number of operational nodes in the system decreases, some degradation in system performance may occur. This is due to the fact that the remaining node(s) are handling an increased workload and potentially satisfying requests from all of the clients. Although response times may increase, the mirroring of the NVLogs as described herein results in a system which can continue operation without loss of data while not having to use all of the bandwidth necessary to mirror the NVLog of every node to the temporary storage of every other node of the system during normal operation.

Figure 14:
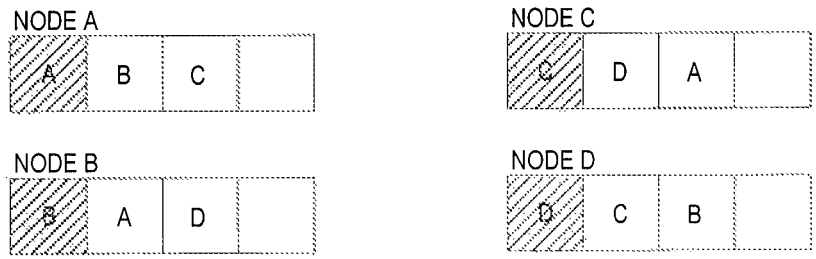
FIG. 14 illustrates responses to successive failures of nodes in a network storage system.
Figure 14:
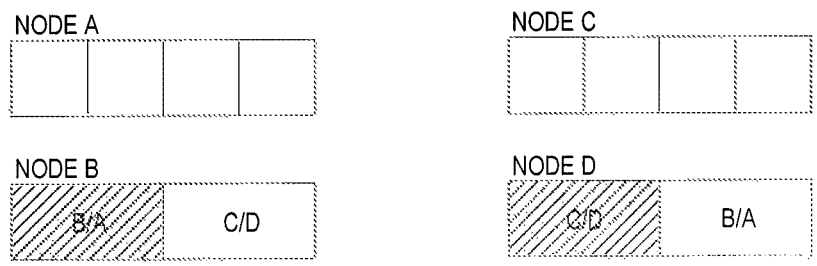
Figure 14:
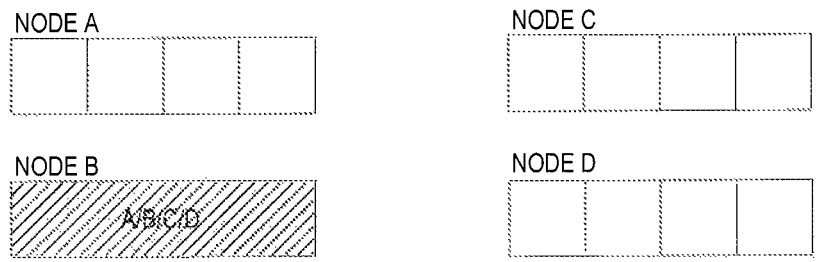

FIG. 14 illustrates a response to a failure of two nodes of a network storage system according to another aspect of the invention. As in previous examples, the NVLog of each node is being mirrored to two other nodes in normal operation. In this example, both node A and node C fail or are taken offline. Consequently, the systems at both sites transition to HA mode wherein the operations of the failed nodes are taken over by their respective HA partners. Node A is failed over to node B and node C is failed over to node D.

Node B becomes the primary location for storage of the NVLog associated with nodes B and A, and node D becomes the primary storage location of the NVLog associated with nodes D and C as indicated by the shading in FIG. 14. In addition, each of these combined NVLogs is also mirrored to the remaining node in the system because a node's NVLog is always mirrored to its DR partner, if available.

FIG. 14 further illustrates another failure occurring before nodes B and C are returned to service or replaced. In this example, node D fails while nodes A and C are failed over to nodes B and D. Upon failure of node D, the network storage system fails over node D to node B, including the responsibilities associated with node C which were temporarily held by node D. Because node D was already mirroring the C/D NVLog to node B, no data is lost. Node B is able to continue operations and continue responding to requests originally associated with any of the four nodes.

Figure 15:
FIG. 15 illustrates responses to successive failures of nodes in a network storage system.
Figure 15:
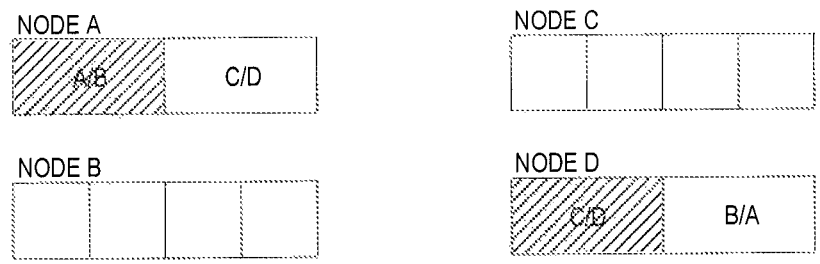
Figure 15:
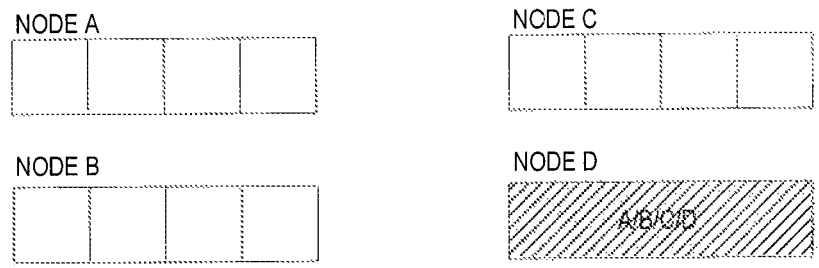

FIG. 15 illustrates a variation of FIGS. 13 and 14 in which nodes B and C initially fail. In the example of FIG. 15, the two nodes which initially fail are neither part of the same HA group, as in FIG. 13, nor are they part of the same DR group, as in FIG. 14. Consistent with previous examples, node B is failed over to its HA partner, node A, and node C is failed over to its HA partner, node D. At this point, the remaining nodes, A and D, cannot mirror their NVLogs as in previous examples. This is true because these two remaining nodes do not have an available HA partner or DR partner. When neither an HA partner or a DR partner is available, the system is configured such that the remaining nodes mirror their NVLogs to another node in the system. In this case, node D mirrors the combined C/D NVLog to node A and node A mirrors the combined A/B NVLog to node D. Each of these nodes is a secondary DR partner to the other which is mirrored to when the primary DR partner is not available.

In the case of a further failure, the remaining node already contains an NVLog copy for all four of the nodes. In the example of FIG. 15, node A subsequently fails and all three of the failed nodes are failed over to node D.

The examples provided in Figures herein are directed at a network storage system which contains two clusters of two nodes each. The methods and apparatuses described herein are also applicable to architectures in which there are additional clusters and/or each cluster contains more than two nodes. In each case, the temporary storage or NVLog of a node will initially be mirrored to at least one HA partner and at least one DR partner. If sufficient failures have occurred such that both the HA partner and the DR partner of a node are no longer available, as in FIG. 15, the node will mirror to another node in the network storage system.

Embodiments of the present invention include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present invention may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

The processes and methods described herein are organized as sequences of operations in the flowcharts. However, at least some of the operations associated with these processes potentially can be reordered, supplemented, or substituted for, while still performing the same overall technique.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, by a takeover node in a first cluster at a first site of a cross-site clustered storage system, a failover request;
processing, by the takeover node, the failover request to identify a first partner node in the first cluster and a second partner node in a second cluster at a second site, the first partner node and the takeover node forming a first high-availability (HA) group, the second partner node and a third partner node in the second cluster forming a second HA group, the first HA group and the second HA group forming a disaster recovery (DR) group and sharing a storage fabric with each other; and
resuming, by the takeover node, client access requests associated with a failed partner node synchronously at the takeover node.

2. The method of claim 1, further comprising:
synchronously replicating, by the takeover node, cache data associated with the takeover node to the first partner node at the first site and the second partner node at the second site during non-failover conditions, wherein the first site and the second site are geographically remote with respect to each other.

3. The method of claim 2, wherein synchronously replicating the cache data comprises synchronously replicating, by the takeover node, the cache data associated with the takeover node to the first partner node using direct memory access (DMA) operations and to the second partner node using remote direct memory access (RDMA) operations.

4. The method of claim 1, further comprising:
assigning, by the takeover node, ownership of a first storage container in the shared storage fabric from the failed partner node to the takeover node, the first storage container geographically co-located at the first site with the takeover node.

5. The method of claim 4, further comprising:
prior to said restoring, writing, by the takeover node, cache data associated with the failed partner node from a takeover cache system in the takeover node to the first storage container, wherein the cache data associated with the failed partner node is synchronously replicated from the failed partner node to the takeover node during normal non-failover conditions.

6. The method of claim 5, wherein the failover request comprises a cluster switchover request indicating a cluster failure at the second cluster and that the failed partner node comprises the second partner node.

7. The method of claim 6, wherein cache data associated with the second partner node synchronously replicates from the second partner node to the takeover node and the third partner node during non-failover conditions.

8. The method of claim 6, further comprising:
prior to said restoring, activating replicated configuration information associated with the second cluster at the first cluster, wherein the replicated configuration information associated with the second cluster synchronously replicates from the second cluster to the first cluster during non-failover conditions.

9. The method of claim 8, wherein said activating the replicated configuration information further comprises:
activating one or more virtual volumes associated with the second cluster at the first cluster; and
activating one or more virtual servers associated with the second cluster at the first cluster.

10. The method of claim 8, further comprising:
responsive to receiving a switchback request, deactivating replicated configuration information associated with second cluster at the first cluster.

11. The method of claim 6, further comprising notifying, by the takeover node, the first partner node of the switchover request.

12. The method of claim 6, further comprising notifying, by the takeover node, non-HA partner nodes in the first cluster of the switchover request.

13. The method of claim 1, wherein the failover request comprises a local failover message and the failed node comprises the first partner node.

14. The method of claim 13, further comprising:
assigning, by the takeover node, ownership of a second storage container in the shared storage fabric from the first partner node to the takeover node, wherein the second storage container is a mirror copy of a first storage container located at the second site.

15. The method of claim 13, wherein cache data associated with the first partner node is synchronously replicated from the first partner node to the takeover node and the third partner node during non-failover conditions.

16. A storage node for use in a first cluster of a clustered storage system, the storage node comprising:
an interface configured to receive a cluster switchover request to failover from a second cluster located at a second site of the clustered storage system to the first cluster located at a first site;
a node management module configured to process the cluster switchover request to identify a first partner node in the first cluster and a second partner node in the second cluster, and assign ownership of a first storage container in a shared storage fabric from the second partner node to the storage node in response to the cluster switchover request, wherein the first storage container is located at the first site, the first partner node and the storage node form a first high-availability (HA) group, the second partner node and a third partner node in the second cluster form a second HA group, and the first HA group and the second HA group forming a disaster recovery (DR) group and share the storage fabric with each other; and
a cache system configured to store cache data associated with the storage node, replicated cache data associated with the first partner node, and replicated cache data associated with the second partner node.

17. The storage node of claim 16, the cache system further configured to write the replicated cache data associated with the second partner node to the first storage container after taking ownership of the first container.

18. The storage node of claim 16, the cache system further configured to synchronously replicate the cache data associated with the storage node to the first partner node and to the second partner node during non-failover conditions.

19. The storage node of claim 16, the node management module further configured to activate replicated configuration information associated with the second cluster at the first cluster, wherein the replicated configuration information associated with the second cluster is synchronously replicated from the second cluster to the first cluster during non-failover conditions.

20. The storage node of claim 19, wherein to activate replicated configuration information associated with the second cluster at the first cluster, the node management module activates one or more virtual volumes associated with the second cluster and one or more virtual servers associated with the second cluster at the first cluster.

21. The storage node of claim 19, the node management module further configured to resume client access requests associated with the second partner node after the replicated configuration information associated with the second cluster is activated at the second cluster.

22. The storage node of claim 16, wherein the first site and the second site are geographically remote with respect to each other.

23. The storage node of claim 22, wherein the cache system comprise non-volatile random access memory.

24. The storage node of claim 23, wherein the non-volatile random access memories are battery backed.

25. A method comprising:
receiving, by a source cluster, a client write request including write data and an indication of a logical container indicating a location to which to write the write data;
identifying, by the source cluster, a source node in the source cluster, the source node associated with the logical container and including a source cache system;
identifying, by the source cluster, a first partner node in the source cluster and a second partner node in a destination cluster, the first partner node having a first cache system and the second partner node having a second cache system; and
concurrently writing, by the source cluster, the client write data to the source cache system, the first cache system, and the second cache system.

26. The method of claim 25, wherein the logical container comprises a virtual volume.

27. The method of claim 25, further comprising periodically writing data in the source cache system to storage containers assigned to the source node in a storage fabric shared by the source cluster and the destination cluster.

28. The method of claim 25, further comprising:
identifying, by the source cluster, a switchback notification indicating a switchback from the destination cluster to the source cluster, the switchback occurring responsive to a healing of the source cluster after a cluster failover event;
identifying, by the source cluster, storage containers in a shared storage fabric owned by the source node prior to the cluster failover event; and
assigning, by the source cluster, ownership of the storage containers to the source node.

29. The method of claim 25 further comprising:
activating, by the source cluster, one or more virtual volumes associated with the source cluster at the source cluster; and
activating, by the source cluster, one or more virtual servers associated with the source cluster at the source cluster.

30. A cluster for use in a clustered storage system, the cluster comprising:
a cluster management module configured to maintain configuration data associated with the cluster and replicated configuration data associated with a second cluster, wherein the configuration data associated with the cluster is replicated to the second cluster; and
a first high-availability (HA) group including a first node having a first cache system and a second node having a second cache system, the first HA group in communication with a second HA group located in a second cluster, the first HA group and the second HA group forming a disaster recovery (DR) group that shares a common storage fabric, the second HA group including a third node having a third cache system and a fourth node having a fourth cache system, wherein the cluster is configured to synchronously replicate storage data directed to the first node to the second node and the third node and synchronously replicate storage data directed to the second node to the first node and the fourth node.

* * * * *